(12) United States Patent
Katayama et al.

(10) Patent No.: US 9,865,853 B2
(45) Date of Patent: Jan. 9, 2018

(54) METHOD FOR PRODUCING ELECTROCHEMICAL DEVICE

(75) Inventors: Hideaki Katayama, Osaka (JP); Toshihiro Abe, Osaka (JP); Nobuaki Matsumoto, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 0 days.

(21) Appl. No.: 13/425,599

(22) Filed: Mar. 21, 2012

(65) Prior Publication Data
US 2012/0174386 A1 Jul. 12, 2012

Related U.S. Application Data

(62) Division of application No. 12/524,332, filed as application No. PCT/JP2008/058542 on May 8, 2008.

(30) Foreign Application Priority Data

| May 10, 2007 | (JP) | 2007-125187 |
| May 30, 2007 | (JP) | 2007-143107 |
| Dec. 20, 2007 | (JP) | 2007-328469 |

(51) Int. Cl.
| H01M 10/0587 | (2010.01) |
| H01M 10/04 | (2006.01) |
| H01M 2/16 | (2006.01) |
| H01G 9/02 | (2006.01) |
| H01M 10/052 | (2010.01) |

(52) U.S. Cl.
CPC ............ *H01M 2/1646* (2013.01); *H01G 9/02* (2013.01); *H01M 2/1653* (2013.01); *H01M 2/1673* (2013.01); *H01M 2/1686* (2013.01); *H01M 10/0431* (2013.01); *H01M 10/052* (2013.01); *H01M 10/0587* (2013.01); *Y10T 29/49108* (2015.01)

(58) Field of Classification Search
None
See application file for complete search history.

(56) References Cited

U.S. PATENT DOCUMENTS

| 5,176,953 A | 1/1993 | Jacoby et al. |
| 5,691,047 A | 11/1997 | Kurauchi et al. |

(Continued)

FOREIGN PATENT DOCUMENTS

| EP | 0 682 376 A1 | 11/1995 |
| EP | 1 900 514 A1 | 3/2008 |

(Continued)

OTHER PUBLICATIONS

Machine translation for Kishii et al., JP 2002-134089 A.*

(Continued)

*Primary Examiner* — Rena D Cronin
(74) *Attorney, Agent, or Firm* — Birch, Stewart, Kolasch & Birch, LLP

(57) ABSTRACT

An electrochemical device of the present invention includes a positive electrode, a negative electrode, a non-aqueous electrolyte, and a separator. The separator includes a first porous layer composed mainly of a thermoplastic resin and a second porous layer composed mainly of insulating particles with a heat-resistant temperature of 150° C. or higher. The first porous layer is disposed to face the negative electrode.

17 Claims, 5 Drawing Sheets

(56) References Cited

U.S. PATENT DOCUMENTS

| | | | |
|---|---|---|---|
| 5,691,077 A | 11/1997 | Yu | |
| 6,261,721 B1 | 7/2001 | Andrieu et al. | |
| 2001/0005560 A1 | 6/2001 | Yoshida et al. | |
| 2001/0008726 A1 | 7/2001 | Murai et al. | |
| 2002/0055036 A1* | 5/2002 | Shinohara et al. | 429/62 |
| 2002/0110729 A1 | 8/2002 | Hozumi et al. | |
| 2005/0158620 A1 | 7/2005 | Kim et al. | |
| 2005/0221165 A1 | 10/2005 | Hennige et al. | |
| 2005/0255769 A1 | 11/2005 | Henninge et al. | |
| 2006/0019151 A1 | 1/2006 | Imachi et al. | |
| 2006/0084365 A1 | 4/2006 | Sakurai et al. | |
| 2006/0286438 A1 | 12/2006 | Fujikawa et al. | |
| 2006/0286439 A1 | 12/2006 | Fujikawa et al. | |
| 2007/0042270 A1 | 2/2007 | Ohata et al. | |
| 2007/0264577 A1 | 11/2007 | Katayama et al. | |
| 2008/0038631 A1 | 2/2008 | Nakura et al. | |
| 2008/0070107 A1 | 3/2008 | Kasamatsu et al. | |
| 2009/0117453 A1 | 5/2009 | Kikuchi et al. | |
| 2009/0181305 A1 | 7/2009 | Nagayama et al. | |

FOREIGN PATENT DOCUMENTS

| | | | | |
|---|---|---|---|---|
| JP | 5-74445 A | | 3/1993 | |
| JP | 7-304110 A | | 11/1995 | |
| JP | 10294123 A | * | 11/1998 | H01M 10/04 |
| JP | 11-7935 A | | 1/1999 | |
| JP | 11-73935 A | | 3/1999 | |
| JP | 2000-44722 A | | 2/2000 | |
| JP | 2000-100408 A | | 4/2000 | |
| JP | 2000-223107 A | | 8/2000 | |
| JP | 2001-23602 A | | 1/2001 | |
| JP | 2001-266949 A | | 9/2001 | |
| JP | 2002-151044 A | | 5/2002 | |
| JP | 2002134089 A | * | 5/2002 | H01M 2/16 |
| JP | 2003-40999 A | | 2/2003 | |
| JP | 2003-272609 A | | 9/2003 | |
| JP | 2004/021469 A2 | | 3/2004 | |
| JP | 2004-363048 A | | 12/2004 | |
| JP | 2005-209570 A | | 8/2005 | |
| JP | 2005-285385 A | | 10/2005 | |
| JP | 2005-536658 A | | 12/2005 | |
| JP | 2006-32359 A | | 2/2006 | |
| JP | 2006-49114 A | | 2/2006 | |
| JP | 2006-59733 A | | 3/2006 | |
| JP | 2006-92829 A | | 4/2006 | |
| JP | 2006-111700 A | | 4/2006 | |
| JP | 2006-269359 A | | 10/2006 | |
| JP | 2006-289657 A | | 10/2006 | |
| JP | 2006-351386 A | | 12/2006 | |
| JP | 2007-26676 A | | 2/2007 | |
| JP | 2007-27100 A | | 2/2007 | |
| JP | 2007-280911 A | | 10/2007 | |
| WO | WO 00/79618 A1 | | 12/2000 | |
| WO | WO 2004/021469 A2 | | 3/2004 | |
| WO | WO 2005/078828 A1 | | 8/2005 | |
| WO | WO 2006/061936 A1 | | 6/2006 | |
| WO | WO 2006/064775 A1 | | 6/2006 | |
| WO | WO 2006/134684 A1 | | 12/2006 | |
| WO | WO 2006/137540 A1 | | 12/2006 | |
| WO | WO 2007/066768 A1 | | 6/2007 | |

OTHER PUBLICATIONS

Derwent Abstract for Hasegawa et al., JP 10-294123 A.*
U.S. Office Action dated Jul. 3, 2012, for U.S. Appl. No. 12/524,332.
First Office Action for corresponding Chinese Patent Application No. 200880005608.6, dated Jun. 12, 2012.
"Integrate," Dictionary and Thesaurus—Merriam-Webster Online. Web. Jan. 17, 2012. <http://www.meriam-webster.com/dictionary/integrate>.
Korean Office Action, dated May 16, 2011, for Korean Application No. 10-2011-7008769.
Machine Translation for Takahashi et al., JP 2000-100408 A.
Japanese Office Action dated Dec. 5, 2013 for Application No. 2008-547199.
United States Office Action for U.S. Appl. No. 12/524,332 dated Mar. 25, 2014.
Japanese Office Action, dated Jun. 30, 2015, for Japanese Application No. 2008-547199.
Japanese Office Action, dated May 19, 2016, for Japanese Application No. 2015-169509.

* cited by examiner

METHOD FOR PRODUCING ELECTROCHEMICAL DEVICE

CROSS REFERENCE TO RELATED APPLICATIONS

This application is a Divisional of pending U.S. patent application Ser. No. 12/524,332 filed on Jul. 23, 2009, which is a National Phase application of PCT/JP2008/058542 filed on May 8, 2008, which claims the benefit under 35 U.S.C. §119(a) to Patent Application Nos. 2007-125187; 2007-143107; and 2007-328469 all filed in Japan, on May 10, 2007; May 30, 2007; and Dec. 20, 2007, respectively. The entire contents of all of the above applications are hereby incorporated by reference.

TECHNICAL FIELD

The present invention relates to an electrochemical device that is safe even in a high-temperature environment by using a separator that is inexpensive and has excellent dimensional stability at high temperatures, and also to a method for manufacturing the electrochemical device.

BACKGROUND ART

Electrochemical devices using a non-aqueous electrolyte, typified by a lithium secondary battery or a super capacitor, are characterized by a high energy density and thus have been widely used as power sources for portable equipment such as a portable telephone and a notebook personal computer. The capacities of the electrochemical devices are likely to increase further as the performance of the portable equipment becomes higher. Therefore, it is important to ensure both safety and reliability.

In the current lithium secondary battery, e.g., a polyolefin microporous film with a thickness of about 20 to 30 µm is used as a separator that is interposed between a positive electrode and a negative electrode. The material of the separator is generally polyethylene (PE) having a low melting point to effect a so-called shutdown. In the course of the shutdown, the resin constituting the separator is melted at a temperature not more than the thermal runaway (abnormal heat generation) temperature of the battery and the pores of the separator are closed by melting the resin. This increases the internal resistance of the battery, thereby improving the safety of the battery when a short circuit or the like occurs.

To improve the porosity and the strength, the above separator may be formed of a uniaxially- or biaxially-oriented film. Since certain strength is needed for the separator during the manufacture of the battery, the strength is ensured by drawing. In such a uniaxially- or biaxially-oriented film, however, the degree of crystallinity of the resin is increased, and the shutdown temperature is close to the thermal runaway temperature of the battery. Thus, in terms of ensuring the safety of the battery, the configuration of the separator has to be reconsidered.

Moreover, the separator of a polyolefin porous film is required to prevent a rise in temperature of the battery by reducing the current as soon as the temperature of the battery reaches the shutdown temperature due to charging anomaly or the like. However, the film has been distorted by drawing, and therefore may shrink due to residual stress when it is subjected to high temperatures. The shrinkage temperature is very close to the melting point, namely the shutdown temperature. For this reason, if the pores are not sufficiently closed and the current cannot be immediately reduced, the temperature of the battery is easily raised to the shrinkage temperature of the separator, so that there is a risk of an internal short circuit caused by shrinkage of the separator.

To improve the safety of the battery from the thermal shrinkage of the separator and the reliability against the internal short circuit due to various causes, a porous separator for an electrochemical device that includes a first separator layer composed mainly of a resin for ensuring a shutdown function and a second separator layer composed of a heat-resistant resin, an inorganic oxide, or the like has been proposed (Patent Documents 1 to 5).

Patent Document 1: WO 2000/079618
Patent Document 2: JP 2001-266949 A
Patent Document 3: WO 2004/021469
Patent Document 4: WO 2007/066768
Patent Document 5: JP 2007-280911 A In the separators disclosed in Patent Documents 1 to 5, the second separator layer has the intrinsic function of a separator, i.e., the function of preventing a short circuit mainly due to direct contact between the positive electrode and the negative electrode. Therefore, a battery with higher safety can be configured, compared to a lithium secondary battery that uses only a separator formed of a polyethylene porous film corresponding to the first separator layer.

However, as a result of further studies conducted by the present inventors, it became clear that an exothermic reaction of the battery could occur even after effecting a shutdown of the separator. The present inventors found that the entire configuration of the battery should be optimized to further improve the safety of the battery after the shutdown.

The present inventors also found that when the positive electrode and the negative electrode were wound in a spiral fashion with a separator having different friction coefficients on both sides, such as the above separator including the layer composed mainly of a resin and the layer composed mainly of a filler (the inorganic oxide etc.), the following problems arose depending on the way of arranging the separator.

That is, when an electrode body was produced by winding the positive electrode, the negative electrode, and the separator around a winding shaft in a spiral fashion with the layer composed mainly of the filler facing the winding shaft, the friction between the winding shaft and the separator was increased. Therefore, the electrode body thus produced could not be easily removed from the winding shaft, and the manufacturing failure was likely to be caused by a winding displacement of the electrode.

DISCLOSURE OF INVENTION

Therefore, with the foregoing in mind, it is an object of the present invention to provide an electrochemical device with excellent safety at high temperatures. Moreover, it is another object of the present invention to provide a method for manufacturing an electrochemical device with excellent productivity.

An electrochemical device of the present invention includes a positive electrode, a negative electrode, a non-aqueous electrolyte, and a separator. The separator includes a first porous layer composed mainly of a thermoplastic resin and a second porous layer composed mainly of insulating particles with a heat-resistant temperature of 150° C. or higher. The first porous layer is disposed to face the negative electrode.

According to a first method for manufacturing an electrochemical device of the present invention, the electrochemical device includes a spiral electrode body that includes a positive electrode, a negative electrode, and a separator, and the separator has different friction coefficients on both sides. The first method includes wrapping the separator around a winding shaft with its lower friction coefficient side facing the winding shaft, and winding the positive electrode and the negative electrode with the separator.

According to a second method for manufacturing an electrochemical device of the present invention, the electrochemical device includes a spiral electrode body that includes a positive electrode, a negative electrode, and a separator, and the separator includes a first porous layer composed mainly of a thermoplastic resin on one side and a second porous layer composed mainly of insulating ceramics particles with a heat-resistant temperature of 150° C. or higher on the other side. The second method includes wrapping the separator around a winding shaft with the first porous layer facing the winding shaft, and winding the positive electrode and the negative electrode with the separator.

The present invention can provide an electrochemical device that has excellent safety when the temperature of a battery is extraordinarily raised because of a short circuit or overcharge. Moreover, according to another aspect of the present invention, the manufacturing failure of a spiral electrode body can be reduced to increase the productivity of the electrochemical device.

BEST MODE FOR CARRYING OUT THE INVENTION

Embodiment 1

Figure 1:
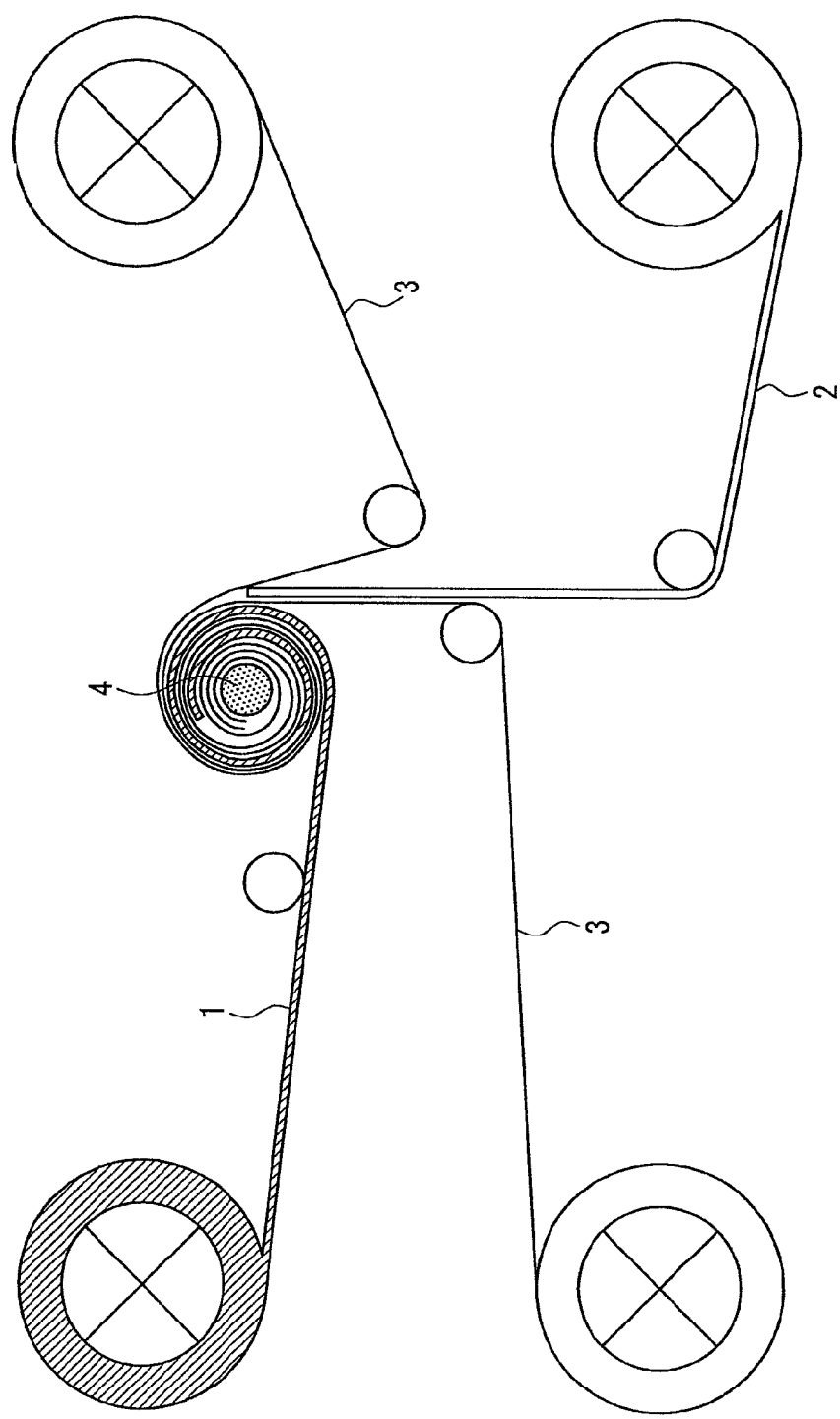
FIG. 1 is a conceptual diagram showing an example of a manufacturing apparatus that can be used in a method for manufacturing an electrochemical device of the present invention.

First, an electrochemical device of the present invention will be described. A separator used for the electrochemical device of the present invention includes a first porous layer composed mainly of a thermoplastic resin and a second porous layer composed mainly of insulating particles with a heat-resistant temperature of 150° C. or higher. In the following, the first porous layer and the second porous layer are referred to as a porous layer (I) and a porous layer (II), respectively.

The porous layer (I) of the separator serves mainly to ensure a shutdown function. When the temperature of the electrochemical device of the present invention reaches the melting point or higher of the thermoplastic resin (referred to as a resin (A) in the following) that is the main component of the porous layer (I), the resin (A) of the porous layer (I) melts and fills the pores of the separator, and thus can effect a shutdown to interfere with the progress of an electrochemical reaction.

The porous layer (II) of the separator has the function of preventing a short circuit due to direct contact between a positive electrode and a negative electrode, even if the internal temperature of the electrochemical device is raised. This function is ensured by the insulating particles (referred to as a filler in the following) with a heat-resistant temperature of 150° C. or higher. In the temperature range of the normal operation of the electrochemical device, e.g., when an electrode body is configured by pressing the positive electrode and the negative electrode together via the separator, the porous layer (II) does not allow a positive electrode active material to pass through the separator and come into contact with the negative electrode, and thus can prevent a short circuit. Moreover, when the temperature of the electrochemical device is raised, the porous layer (II) can suppress shrinkage of the porous layer (I). Alternatively, even if the porous layer (I) shrinks, the porous layer (II) because of its good shape stability at high temperatures can prevent a short circuit due to direct contact between the positive electrode and the negative electrode. In particular, when the porous layer (I) and the porous layer (II) are integrally formed, the heat-resistant porous layer (II) acts as a matrix for maintaining the shape of the separator and can suppress thermal shrinkage of the porous layer (I), i.e., thermal shrinkage of the whole separator.

In the present specification, except for a porous matrix, as will be described later, the "heat-resistant temperature of 150° C. or higher" means that no deformation such as softening is observed at a temperature of at least 150° C.

In the separator used for the electrochemical device of the present invention, the porous layer (I) composed mainly of the thermoplastic resin is formed so that the solid content of the resin (A), namely the thermoplastic resin in the porous layer (I) is 50 vol % or more. The porous layer (II) composed mainly of the filler with a heat-resistant temperature of 150° C. or higher is formed so that the solid content of the filler with a heat-resistant temperature of 150° C. or higher in the porous layer (II) is 50 vol % or more. However, in the case of a separator having a porous matrix, as will be described later, the above volume ratio is calculated without including the volume of the porous matrix.

In the separator, it is preferable that at least one of the porous layers (I) and (II) includes plate-like particles. The use of the plate-like particles in at least one of the porous layers (I) and (II) increases a tortuosity factor of the pores within the separator, so that the path length of the pores becomes longer. Therefore, even under the condition that dendrites are easily produced, the electrochemical device including the above separator is not likely to cause a short circuit between the negative electrode and the positive electrode due to the presence of dendrites, and thus can improve the reliability against the dendrite short circuit. When the porous layer (II) includes plate-like particles, these plate-like particles also can be used as the "filler with a heat-resistant temperature of 150° C. or higher", that is, a part or the whole of the filler included in the porous layer (II) can be made of the plate-like particles.

In the separator, at least one of the porous layers (I) and (II) also may include a filler having a secondary particle structure in which the secondary particles are formed by the agglomeration of primary particles. As in the case of the plate-like particles, the use of the filler having the secondary particle structure increases a tortuosity factor of the pores within the separator, so that the path length of the pores becomes longer. When the porous layer (II) includes a filler having the secondary particle structure, this filler also can be used as the "filler with a heat-resistant temperature of 150° C. or higher", that is, a part or the whole of the filler included in the porous layer (II) can be made of the secondary particles. Moreover, at least one of the porous layers (I) and (II) may include both the plate-like particles and the secondary particles.

The resin (A) of the porous layer (I) is preferably an electrochemically stable thermoplastic resin that has electrical insulation, is stable to an electrolyte used for the electrochemical device, and is less susceptible to oxidation-reduction in the operating voltage range of a battery. Specific examples of the resin (A) include polyethylene (PE), polypropylene (PP), copolymerized polyolefin, a polyolefin derivative (such as chlorinated polyethylene), a polyolefin wax, a petroleum wax, and a carnauba wax. The copolymerized polyolefin may include an ethylene-propylene copolymer and a copolymer of ethylene-vinyl monomer. More specifically, the copolymerized polyolefin may include an ethylene-vinyl acetate copolymer (EVA) and an ethylene-acrylic acid copolymer such as an ethylene-methyl acrylate copolymer or an ethylene-ethyl acrylate copolymer. It is desirable that the structural unit derived from ethylene in the copolymerized polyolefin is 85 mol % or more. Further, polycycloolefin and polyester such as polyethylene terephthalate or copolymerized polyester also can be used. The above examples of the resin (A) may be used individually or in combinations of two or more.

Among the above materials, PE, PP, and the copolymerized polyolefin are preferably used as the resin (A). The resin (A) also may include various types of additives (an antioxidant etc.) as needed, which are to be added to the resin.

It is preferable that the separator has the property of being able to close its pores (i.e., the shutdown function) in the range of 80° C., more preferably 100° C. to 140° C., more preferably 130° C. Therefore, it is desirable that the resin (A) of the porous layer (I) is a thermoplastic resin with a melting point of 80° C., more preferably 100° C. to 140° C., more preferably 130° C. The melting point of the resin (A) can be determined, e.g., by a melting temperature that is measured with a differential scanning calorimeter (DSC) according to the regulations of the Japanese Industrial Standards (JIS) K 7121.

The resin (A) may be in any form, including fine particles. For example, when a fibrous material constituting a porous matrix, as will be described later, is used as a core material, the resin (A) is attached to or covers the surface of the core material. The porous layer (I) also may include the resin (A) so as to have a core-shell structure in which the core is, e.g., the "filler with a heat-resistant temperature of 150° C. or higher" used in the porous layer (II) and the shell is the resin (A). It is particularly preferable that the resin (A) is in the form of fine particles.

Moreover, the porous layer (I) may be a microporous film composed mainly of the resin (A). Examples of this microporous film include a polyolefin microporous film used for a lithium secondary battery or the like, and a uniaxially- or biaxially-oriented microporous film made of, e.g., PE or copolymerized polyolefin such as an ethylene-propylene copolymer. The porous layer (I) also may be a laminated porous film obtained by laminating 2 to 5 layers of different thermoplastic resins such as PE and PP.

When the resin (A) is in the form of fine particles, the particle size should be smaller than the thickness of the separator in a dry state, and the average particle size is preferably $1/100$ to $1/3$ of the thickness of the separator. Specifically, it is preferable that the resin (A) has an average particle size of 0.1 to 20 μm. If the particle size of the resin (A) is too small, a space between the particles is excessively reduced, and the ion conduction path becomes excessively long. Thus, the characteristics of the electrochemical device may be degraded. If the particle size of the resin (A) is too large, the thickness of the porous layer (I) is increased, resulting in a lower energy density of the electrochemical device.

When the porous layer (I) includes both a thermoplastic resin with a melting point of 80° C. to 140° C. such as PE and a thermoplastic resin with a melting point of higher than 140° C. such as PP, the resin (e.g., PE) with a melting point of 80° C. to 140° C. is preferably 30 mass % or more, and more preferably 50 mass % or more of the resin (A) constituting the porous layer (I) (i.e., a resin porous film). Examples of this porous layer (I) include a resin porous film obtained by mixing PE and a resin (e.g., PP) with a higher melting point than that of PE, and a resin porous film obtained by laminating a PE layer and a resin layer (e.g., PP layer) made of a resin with a higher melting point than that of PE.

A melt viscosity at 140° C. (simply referred to as a "melt viscosity" in the following) of the resin (A) of the porous layer (I) is preferably 1000 mPa·s or more, and more preferably 5000 mPa·s or more.

The electrode of the electrochemical device generally has a porous, active material containing layer that contains an active material or the like. When this active material containing layer is in contact with the separator, a part of the molten resin (A) can be absorbed by the active material containing layer. If the amount of the resin (A) absorbed is increased, the resin (A) for filling the pores of the separator is reduced, so that a shutdown may not occur easily. However, when the melt viscosity of the resin (A) is high enough to ensure the shutdown function, the amount of the resin (A) absorbed by the active material containing layer can be reduced, and the molten resin (A) efficiently fills the pores of the separator. Therefore, a shutdown occurs successfully. This can improve the safety of the electrochemical device at high temperatures.

With the use of the resin (A) having the above melt viscosity, the resin (A) is melted in the electrochemical device and utilized efficiently to fill the pores of the separator. Thus, it is also possible to reduce the amount of the resin (A) used in the separator. Accordingly, since the whole separator can be made thinner, it is also possible to improve the energy density of the electrochemical device such as a battery.

On the other hand, an excessively high melt viscosity of the resin (A) weakens the action of the resin (A) to fill the pores of the separator, and thus can make it difficult to provide the shutdown property. Therefore, the melt viscosity of the resin (A) is preferably 1000000 mPa·s or less, and more preferably 100000 mPa·s or less.

If PE is used as a thermofusible resin having the above melt viscosity, the molecular weight of PE may be about 2000 to 100000.

The melt viscosity of the resin (A) can be measured, e.g., with CAPILOGRAPH (manufactured by TOYO SEIKI SEISAKU-SHO, LTD.) using a nozzle that has a length (L) of 10 mm and a diameter (D) of 1.0 mm at a shear rate of $100^{-1}$ s.

To achieve the shutdown effect more easily, the content of the resin (A) in the porous layer (I) is preferably 50 vol % or more, more preferably 70 vol % or more, and further preferably 80 vol % or more of the total amount of components in the porous layer (I). Alternatively, the content of the resin (A) may be 100 vol %, as in the case where the entire porous layer (I) is a microporous film. Moreover, the volume of the resin (A) is preferably 10 vol % or more, and more preferably 20 vol % or more of the total amount of components in the separator. On the other hand, in terms of ensuring the shape stability of the separator at high temperatures, the volume of the resin (A) is preferably 80 vol % or less, and more preferably 40 vol % or less. The volume of the resin (A) is preferably 50% or more of that of the pores in the porous layer (II) so as to achieve the shutdown effect more easily.

The filler of the porous layer (II) may be either organic particles or inorganic particles as long as they are electrochemically stable particles that have a heat-resistant temperature of 150° C. or higher, are stable to an electrolyte, and are less susceptible to oxidation-reduction in the operating voltage range of the electrochemical device. However, the filler is preferably in the form of fine particles in terms of dispersion or the like, and more preferably in the form of inorganic fine particles in terms of stability or the like.

Specific examples of the constituents of the inorganic particles include the following: inorganic oxides such as an iron oxide, silica ($SiO_2$), alumina ($Al_2O_3$), a titanium oxide ($TiO_2$), barium titanate ($BaTiO_3$), and a zirconium oxide ($ZrO_2$); inorganic nitrides such as an aluminum nitride and a silicon nitride; hardly-soluble electrovalent compounds such as a calcium fluoride, a barium fluoride, and barium sulfate; covalent compounds such as silicon and diamond; and clays such as montmorillonite. The inorganic oxides may be materials derived from the mineral resources such as boehmite, zeolite, apatite, kaoline, mullite, spinel, olivine, and mica or artificial products of these materials. Moreover, the inorganic oxides may be in the form of electrically insulating particles obtained by covering the surface of a conductive material with a material having electrical insulation (e.g., any of the above inorganic oxides). Examples of the conductive material include conductive oxides such as a metal, $SnO_2$, and an indium tin oxide (ITO), and carbonaceous materials such as carbon black and graphite. Among the above inorganic oxides, $Al_2O_3$, $SiO_2$, $TiO_2$, $ZrO_2$, and boehmite are particularly suitable.

Examples of the organic particles (organic powder) include the following: various cross-linked polymer fine particles such as cross-linked polymethyl methacrylate, cross-linked polystyrene, cross-linked polydivinylbenzene, a cross-linked styrene-divinylbenzene copolymer, polyimide, a melamine resin, a phenol resin, and a benzoguanamine-formaldehyde condensation product; and heat-resistant polymer fine particles such as polypropylene (PP), polysulfone, polyacrylonitrile, aramid, polyacetal, and thermoplastic polyimide. The organic resin (polymer) constituting these organic particles may be a mixture, a modified product, a derivative, a copolymer (a random copolymer, an alternating copolymer, a block copolymer, or a graft copolymer), or a cross-linked product (in the case of the heat-resistant polymer) of the above resin materials.

The shape of the filler is not particularly limited. For example, the filler may be nearly spherical in shape or in the form of plate-like particles. In terms of preventing a short circuit, it is preferable that the filler is in the form of plate-like particles or has a secondary particle structure in which the secondary particles are formed by the agglomeration of primary particles. Typical examples of the plate-like particles and the secondary particles include $Al_2O_3$ or boehmite plate-like particles and $Al_2O_3$ or boehmite secondary particles. When the porous layer (I) and the porous layer (II) are integrally formed in the separator, the use of plate-like particles or particles having a secondary particle structure as the filler increases the action of the porous layer (II) to maintain the shape of the separator, so that the effect of suppressing thermal shrinkage of the separator can be improved. In particular, a higher effect can be expected by using the plate-like particles.

The number average particle size of the filler is in the range of preferably 0.01 µm, more preferably 0.1 µm to preferably 15 µm, more preferably 5 µm.

In the present invention, the average particle size of the resin or filler can be measured, e.g., with a laser diffraction particle size analyzer (LA-920 manufactured by Horiba, Ltd.) by dispersing the particles in a medium (water etc.) with which the particles to be measured do not swell or dissolve.

The content of the filler with a heat-resistant temperature of 150° C. or higher in the porous layer (II) is preferably 50 vol % or more, more preferably 70 vol % or more, further preferably 80 vol % or more, and most preferably 90 vol % or more of the total volume of components in the porous layer (II). The porous layer (II) may include an organic binder for binding the filler particles or binding the porous layer (I) and the porous layer (II) as needed. The porous layer (II) also may include a fibrous material, as will be described later, the resin (A), and other additive particles. By increasing the content of the filler in the porous layer (II), it is possible to favorably suppress the occurrence of a short circuit due to direct contact between the positive electrode and the negative electrode when the temperature of the electrochemical device is raised. Moreover, when the porous layer (I) and the porous layer (II) are formed integrally in the separator, thermal shrinkage of the whole separator can be favorably suppressed. If the porous layer (II) includes an organic binder, the content of the organic binder is preferably 1 vol % or more of the total volume of components in the porous layer (II) so as to enhance the binding property.

To improve the effect of preventing an internal short circuit, the content of the filler is preferably 20 vol % or more, and more preferably 50 vol % or more of the total amount of components in the separator. To ensure the shutdown function of the resin (A), the content of the filler is preferably 80 vol % or less of the total amount of components in the separator.

The plate-like particles may be in a form such that the aspect ratio (i.e., the ratio of the maximum length to the thickness of the plate-like particles) is in the range of preferably 5, more preferably 10 to preferably 100, more preferably 50. The average value of the ratios of length in the major axis direction to length in the minor axis direction (length in the major axis direction/length in the minor axis direction) of a plane of each plate-like particle is preferably 3 or less, more preferably 2 or less, and particularly close to 1. The aspect ratio can be determined, e.g., by analyzing the scanning electron microscope (SEM) images.

It is preferable that the plate-like particles are oriented in the separator so that their planes are substantially parallel to the surface of the separator. More specifically, the average angle between the surface of the separator and the planes of the plate-like particles located in the vicinity of the surface of the separator is preferably 30° or less, and particularly as close as possible to 0°. In this case, the "vicinity of the surface" indicates a region that extends from the surface of the separator to about 10% of the total thickness. By improving the orientation of the plate-like particles, the action of the porous layer (II) to maintain the shape of the separator is increased, and an internal short circuit due to lithium dendrites deposited on the electrode surface or the active material protruding from the electrode surface can be prevented more effectively.

The specific surface area of the secondary particles used as the filler is in the range of preferably 3 m²/g, more preferably 10 m²/g to preferably 50 m²/g, more preferably 30 m²/g. The bulk density of the secondary particles is in the range of preferably 0.1 g/cm³, more preferably 0.15 g/cm³ to preferably 0.5 g/cm³, more preferably 0.3 g/cm³.

The average particle size of the plate-like particles or the secondary particles should be smaller than the thickness of the separator, and preferably 1/100 or more of the thickness of the separator. In the case of the secondary particles, the average particle size of the primary particles constituting the secondary particles is preferably in the range of 1/100 to 1/5 of that of the secondary particles.

As the plate-like particles or the secondary particles, organic particles made of a resin material with a heat-resistant temperature of 150° C. or higher also can be used in addition to the above specific examples of the inorganic particles (typified by the $Al_2O_3$ or boehmite plate-like particles). The plate-like particles or the secondary particles may include two or more materials.

To provide the effect of including the plate-like particles or the secondary particles in at least one of the porous layer (I) and the porous layer (II) more effectively, the content of the plate-like particles or the secondary particles is preferably 25 vol % or more, more preferably 40 vol % or more, and further preferably 70 vol % or more of the total volume of components in the separator. In this case, the volume of components in the separator does not include the volume of a porous matrix, as will be described later.

It is more preferable that the plate-like particles or the secondary particles are included in the porous layer (II). It is further preferable that the plate-like particles or the secondary particles are used as the "filler with a heat-resistant temperature of 150° C. or higher" in the porous layer (II).

The porous layer (I) and the porous layer (II) of the separator may include an organic binder to ensure the shape stability of the separator, to integrate the porous layer (I) with the porous layer (II), or the like. Examples of the organic binder include the following: EVA (having 20 to 35 mol % of a structural unit derived from vinyl acetate); an ethylene-acrylic acid copolymer such as an ethylene-ethyl acrylate copolymer (EEA); fluoro-rubber; styrene-butadiene rubber (SBR); carboxymethyl cellulose (CMC); hydroxyethyl cellulose (HEC); polyvinyl alcohol (PVA); polyvinyl butyral (PVB); polyvinyl pyrrolidone (PVP); a cross-linked acrylic resin; polyurethane; and an epoxy resin. In particular, a heat-resistant binder with a heat-resistant temperature of 150° C. or higher is suitable. The above examples of the organic binder may be used individually or in combinations of two or more.

Among the above examples of the organic binder, highly flexible binders such as EVA, the ethylene-acrylic acid copolymer, the fluoro-rubber, and SBR are preferred. Specific examples of the highly flexible organic binder include the following: "EVAFLEX series (EVA)" manufactured by DU PONT-MITSUI POLYCHEMICALS CO., LTD.; EVA manufactured by NIPPON UNICAR CO., LTD.; "EVAFLEX-EEA series (an ethylene-acrylic acid copolymer)" manufactured by DU PONT-MITSUI POLYCHEMICALS CO., LTD.; EEA manufactured by NIPPON UNICAR CO., LTD.; "DAI-EL LATEX series (fluoro-rubber)" manufactured by DAIKIN INDUSTRIES, Ltd.; "TRD-2001 (SBR)" manufactured by JSR Corporation; and "EM-400B (SBR)" manufactured by ZEON CORPORATION.

When the porous layer (II) includes the organic binder, the organic binder may be dissolved or emulsified in a solvent of a composition for forming the porous layer (II), as will be described later.

To ensure the shape stability or flexibility of the separator, the fibrous material may be mixed with the filler or the resin (A) of the porous layer (I) or the porous layer (II). The fibrous material is not particularly limited as long as it has a heat-resistant temperature of 150° C. or higher, has electrical insulation, is electrochemically stable, and is also stable to an electrolyte or a solvent used in producing the separator, as will be described later. The "fibrous material" in the present specification has an aspect ratio (length in the longitudinal direction/width (diameter) in the direction perpendicular to the longitudinal direction) of 4 or more. The aspect ratio is preferably 10 or more.

Specific examples of the constituents of the fibrous material include the following: cellulose and its modified product such as carboxymethyl cellulose (CMC) and hydroxypropyl cellulose (HPC); polyolefin such as polypropylene (PP) and a propylene copolymer; polyester such as polyethylene terephthalate (PET), polyethylene naphthalate (PEN), and polybutylene terephthalate (PBT); resins such as polyacrylonitrile (PAN), aramid, polyamide imide, and polyimide; and inorganic oxides such as glass, alumina, zirconia, and silica. The fibrous material may include two or more of these constituents. The fibrous material also may include various types of additives (an antioxidant etc. used in the case of a resin fibrous material) as needed.

To improve the handling of the separator when it is used as an independent film, either the porous layer (I) or the porous layer (II) can be a porous matrix with a heat-resistant temperature of 150° C. or higher. The porous layer (I) and the porous layer (II) also can share a porous matrix. The porous matrix may be formed of a fibrous material with a heat-resistant temperature of 150° C. or higher, and more specifically a sheet material such as a woven or nonwoven fabric (including paper). In this case, it is preferable that the filler or the resin (A) is contained in the pores of the porous matrix. The above organic binder also can be used to bind the filler or the resin (A).

The "heat resistance" of the porous matrix means that a dimensional change does not occur substantially due to softening or the like. The heat resistance is evaluated on the basis of whether the upper limit temperature (heat-resistant temperature) at which the ratio of shrinkage, i.e., a change in length of the object to be evaluated (porous matrix) to the length of the object at room temperature, namely the shrinkage ratio can remain at 5% or less is sufficiently higher than a shutdown temperature of the separator. To improve the safety of the electrochemical device after a shutdown, it is desirable that the porous matrix has a heat-resistant temperature at least 20° C. higher than the shutdown temperature. More specifically, the heat-resistant temperature of the porous matrix is preferably 150° C. or higher, and more preferably 180° C. or higher.

The fiber diameter of the fibrous materials (including the fibrous material for the porous matrix and the other fibrous materials) should be not more than the thickness of each of the porous layer (I) and the porous layer (II). For example, the fiber diameter is preferably 0.01 to 5 µm. If the fiber diameter is too large, entanglement of the fibrous material is insufficient. Therefore, when the porous matrix is formed of, e.g., a sheet material, the strength of the porous matrix is reduced, and thus handling can be difficult. If the fiber diameter is too small, the pores of the separator become excessively small. Therefore, the ion permeability tends to be low, and the load characteristics of the electrochemical device can be degraded.

When the fibrous material is used for the porous layer (II), the content of the fibrous material is in the range of preferably 10 vol %, more preferably 20 vol % to preferably 90 vol %, more preferably 80 vol % of the total amount of components in the porous layer (II). The fibrous material is present in the porous layer (II) so that the angle between the surface of the separator and the major axis (i.e., the axis in the longitudinal direction) of the fibrous material is, on average, preferably 30° or less, and more preferably 20° or less.

In terms of further improving the effect of preventing a short circuit in the electrochemical device of the present invention and ensuring the strength of the separator to achieve better handling, the thickness of the separator is preferably 3 μm or more, more preferably 6 μm or more, and most preferably 10 μm or more. On the other hand, in terms of further improving the energy density of the electrochemical device of the present invention, the thickness of the separator is preferably 50 μm or less, more preferably 30 μm or less, and most preferably 20 μm or less.

When the thicknesses of the porous layer (I) and the porous layer (II) of the separator are represented by X (μm) and Y (μm), respectively, the ratio of X to Y (X/Y) is in the range of preferably 1/8, more preferably 1/5 to preferably 10, more preferably 5. In the separator used for the electrochemical device of the present invention, even if the thickness ratio is increased by reducing the thickness of the porous layer (II), the occurrence of a short circuit due to thermal shrinkage of the separator can be suppressed while ensuring a better shutdown function. When a plurality of porous layers (I) are present in the separator, X represents the total thickness of the plurality of porous layers (I). When a plurality of porous layers (II) are present in the separator, Y represents the total thickness of the plurality of porous layers (II).

Specific values of X and Y are as follows. X is preferably 1 μm or more, more preferably 3 μm or more, and most preferably 5 μm or more. Also, X is preferably 30 μm or less, more preferably 15 μm or less, and most preferably 10 μm or less. Y is preferably 1 μm or more, more preferably 2 μm or more, and most preferably 4 μm or more. Also, Y is preferably 30 μm or less, more preferably 20 μm or less, even more preferably 10 μm or less, and most preferably 6 μm or less.

To improve the ion permeability by ensuring the holding of the electrolyte, the porosity of the separator is preferably 15% or more, more preferably 20% or more, and most preferably 30% or more in a dry state. On the other hand, in terms of ensuring the strength of the separator and preventing an internal short circuit, the porosity of the separator is preferably 70% or less, and more preferably 60% or less in a dry state. The porosity P (%) of the separator can be calculated from the thickness of the separator, the mass per unit area of the separator, and the densities of the components of the separator by obtaining a summation for each component i with the following formula (1).

$$P=100-(\Sigma a_i/\rho_i) \times (m/t) \qquad (1)$$

where $a_i$ represents the ratio of a component i expressed as a mass percentage, $\rho_i$ represents the density (g/cm³) of the component i, m represents the mass (g/cm²) per unit area of the separator, and t represents the thickness (cm) of the separator.

In the formula (1), when m represents the mass (g/cm²) per unit area of the porous layer (I) and t represents the thickness (cm) of the porous layer (I), the porosity P (%) of the porous layer (I) can be determined. The porosity of the porous layer (I) obtained in this manner is in the range of preferably 10%, more preferably 30% to preferably 70%, more preferably 50%.

In the formula (1), when m represents the mass (g/cm²) per unit area of the porous layer (II) and t represents the thickness (cm) of the porous layer (II), the porosity P (%) of the porous layer (II) can be determined. The porosity of the porous layer (II) obtained in this manner is in the range of preferably 10%, more preferably 20% to preferably 60%, more preferably 50%.

It is desirable that the separator has a Gurley value of 10 to 300 sec. The Gurley value is obtained by a method according to JIS P 8117 and expressed as the length of time (seconds) it takes for 100 mL air to pass through a membrane at a pressure of 0.879 g/mm². If the Gurley value (air permeability) is too large, the ion permeability can be reduced. On the other hand, if the Gurley value is too small, the strength of the separator can be reduced. It is desirable that the strength of the separator is penetrating strength measured using a 1 mm diameter needle, and that the penetrating strength is 50 g or more. If the penetrating strength is too small, lithium dendrite crystals may penetrate the separator when they are produced, thus leading to a short circuit.

The average pore diameter of the separator is in the range of preferably 0.01 μm, more preferably 0.05 μm to preferably 1 μm, more preferably 0.5 μm. The average pore diameter of the porous layer (I) is preferably 0.01 to 0.5 μm. The average pore diameter of the porous layer (II) is preferably 0.05 to 1 μm. The average pore diameter can be measured with a mercury porosimeter or the like.

The shutdown property of the separator can be determined, e.g., by changes in the internal resistance of the electrochemical device with temperature. Specifically, the electrochemical device is placed in a thermostatic bath, and then the temperature is raised from room temperature at a rate of 1° C. per minute. The shutdown property of the separator is evaluated based on a temperature at which the internal resistance of the electrochemical device is increased. In this case, the internal resistance of the electrochemical device after the temperature is raised to 150° C. is preferably at least five times, more preferably at least ten times as large as that before the temperature rise.

The thermal shrinkage ratio of the separator is preferably 5% or less, and more preferably 1% or less at 150° C. With these characteristics of the separator, even if the internal temperature of the electrochemical device reaches about 150° C., the separator hardly shrinks, and therefore a short circuit due to contact between the positive electrode and the negative electrode can be prevented more reliably. This can further improve the safety of the electrochemical device at high temperatures. When the porous layer (I) and the porous layer (II) are integrally formed in the separator, the thermal shrinkage ratio indicates a shrinkage ratio of the whole separator. When the porous layer (I) and the porous layer (II) are independent of each other, the thermal shrinkage ratio indicates a shrinkage ratio of one porous layer smaller than that of the other. As will be described later, the porous layer (I) and/or the porous layer (II) may be integrated with the electrode. In such a case, the thermal shrinkage ratio is measured while at least one of the porous layers (I) and (II) is integrated with the electrode.

The above "thermal shrinkage ratio at 150° C." can be determined in the following manner. First, the separator or the porous layer (I) and the porous layer (II) (in some cases, at least one of the porous layers (I) and (II) is integrated with the electrode) are placed in a thermostatic bath. After the temperature is raised to 150° C., the separator or the porous layer (I) and the porous layer (II) are allowed to stand for 3 hours, and then taken out of the thermostatic bath. The dimensions of the separator or the porous layer (I) and the porous layer (II) thus obtained are compared to those of the separator or the porous layer (I) and the porous layer (II) before being placed in the thermostatic bath. Consequently, the ratio of decrease in dimension is calculated and expressed as a percentage.

As a method for producing a separator used for the electrochemical device of the present invention, e.g., any of the following methods (a) to (f) can be employed. In the method (a) for producing the separator, one of a composition (e.g., a liquid composition such as slurry) for forming the porous layer (I) that includes the resin (A) and a composition (e.g., a liquid composition such as slurry) for forming the porous layer (II) that includes the filler is applied to a porous matrix, and then dried at a predetermined temperature. Subsequently, the other composition is further applied to the porous matrix, and then dried at a predetermined temperature. In this case, the porous matrix may be formed of a porous sheet such as a woven fabric made of at least one type of fibrous material including the various constituents as described above or a nonwoven fabric having a structure in which the fibrous material is entangled. More specifically, examples of the nonwoven fabric include paper, a PP nonwoven fabric, polyester nonwoven fabrics (a PET nonwoven fabric, a PEN nonwoven fabric, a PBT nonwoven fabric, etc.), and a PAN nonwoven fabric.

The composition for forming the porous layer (I) includes a filler, an organic binder, or the like as needed other than the resin (A), and these are dispersed in a solvent (including a dispersion medium, which is true in the following). The organic binder may be dissolved in the solvent. The solvent used for the composition for forming the porous layer (I) is not particularly limited as long as it can uniformly disperse the resin (A) or the filler and also can uniformly dissolve or disperse the organic binder. In general, e.g., organic solvents, including aromatic hydrocarbons such as toluene, furans such as tetrahydrofuran, and ketones such as methyl ethyl ketone and methyl isobutyl ketone, can be suitably used. Moreover, alcohols (ethylene glycol, propylene glycol, etc.) or various propylene oxide glycol ethers such as monomethyl acetate may be appropriately added to those solvents to control the surface tension. When the organic binder is soluble in water or the organic binder is used in the form of emulsion, water may be used as a solvent. In this case, alcohols (methyl alcohol, ethyl alcohol, isopropyl alcohol, ethylene glycol, etc.) also can be appropriately added to control the surface tension.

The composition for forming the porous layer (II) includes the resin (A), an organic binder, or the like as needed other than the filler, and these are dispersed in a solvent. The various types of solvents used for the composition for forming the porous layer (I) also can be used for the composition for forming the porous layer (II). Moreover, the various types of components added appropriately to control the surface tension in the composition for forming the porous layer (I) also can be added.

In the composition for forming the porous layer (I) and the composition for forming the porous layer (II), the solid content including the resin (A), the filler, and the organic binder is preferably 10 to 80 mass %.

If the pore diameter of the porous matrix is relatively large, e.g., 5 µm or more, this tends to cause a short circuit of the electrochemical device. In such a case, therefore, it is preferable that a part or the whole of the resin (A), the filler, the plate-like particles, and the secondary particles is contained in the pores of the porous matrix. The resin (A), the filler, the plate-like particles, and the secondary particles can be present in the pores of the porous matrix, e.g., by applying the compositions for forming the porous layers that include these materials to the porous matrix, allowing the porous matrix to pass through a predetermined gap to remove extra composition, and subsequently drying the porous matrix.

To improve the orientation of the plate-like particles in the separator so that the function of the separator is performed more effectively, e.g., the composition for forming the porous layer that includes the plate-like particles may be applied to and impregnated into the porous matrix, and then subjected to shear or a magnetic field. For example, as described above, after the composition for forming the porous layer that includes the plate-like particles is applied to the porous matrix, the composition can be subjected to shear by allowing the porous matrix to pass through a predetermined gap.

To exhibit the action of each of the materials such as the resin (A), the filler, the plate-like particles, and the secondary particles more effectively, the materials may be unevenly distributed and collected in layers parallel or substantially parallel to the film surface of the separator. This can be achieved in the following manner. For example, using two heads or rolls of a die coater or a reverse roll coater, different compositions such as the composition for forming the porous layer (I) and the composition for forming the porous layer (II) are applied separately from both directions, i.e., the upper and lower sides of the porous matrix, and then dried.

In the method (b) for producing the separator, one of the composition for forming the porous layer (I) and the composition for forming the porous layer (II) is applied to a porous matrix, and the other composition is further applied to the porous matrix before the previously applied composition is dried. Subsequently, these compositions are dried.

In the method (c) for producing the separator, the composition for forming the porous layer (I) is applied to a porous matrix, and then dried to form the porous layer (I) composed mainly of the resin (A). The composition for forming the porous layer (II) is applied to another porous matrix, and then dried to form the porous layer (II) composed mainly of the filler. These two porous layers are laminated together into a separator. In this case, the porous layer (I) and the porous layer (II) may be integrally formed. Alternatively, the porous layer (I) and the porous layer (II) may be independent of each other, and when the electrochemical device is assembled, the porous layers (I) and (II) are laminated together in the electrochemical device so as to function as an integral separator.

In the method (d) for producing the separator, the composition for forming the porous layer (I) and the composition for forming the porous layer (II) further include a fibrous material as needed. These compositions are applied to a substrate such as a film or a metal foil, dried at a predetermined temperature, and then removed from the substrate. Like the method (c), the porous layer (I) composed mainly of the resin (A) and the porous layer (II) composed mainly of the filler may be either independent of each other or integrally formed. When the porous layer (I) and the porous layer (II) are integrally formed, one porous layer may be formed and dried, and subsequently the other porous layer may be formed, as in the case of the method (a). Moreover, one composition for forming the porous layer may be applied, and the other composition for forming the porous layer may be applied before the previously applied composition is dried. Further, the two compositions for forming the porous layers may be applied simultaneously, i.e., a so-called simultaneous multilayer application method may be used.

In the method (e) for producing the separator, the composition for forming the porous layer (II) that includes the filler is applied to a porous matrix, and then dried at a predetermined temperature. This porous matrix is laminated with a microporous film composed mainly of the resin (A), which is to be the porous layer (I), to form a separator. In this case, the porous layer (I) and the porous layer (II) may be integrally formed. Alternatively, the porous layer (I) and the porous layer (II) may be independent of each other, and when the electrochemical device is assembled, the porous layers (I) and (II) are laminated together in the electrochemical device so as to function as an integral separator.

In the method (f) for producing the separator, the composition for forming the porous layer (II) further includes a fibrous material as needed. This composition is applied to a substrate such as a film or a metal foil, dried at a predetermined temperature, and then removed from the substrate. The resultant layer is laminated with a microporous film composed mainly of the resin (A), which is to be the porous layer (I), to form a separator. Like the method (e) or the like, the porous layer (I), i.e., the microporous film composed mainly of the resin (A) and the porous layer (II) composed mainly of the filler may be either independent of each other or integrally formed. The porous layer (I) and the porous layer (II) can be integrally formed in the following manner. The porous layer (I) and the porous layer (II) have been separately formed and are bonded together by roll pressing or the like. Moreover, the composition for forming the porous layer (II) is applied to the surface of the porous layer (I) instead of the substrate, and then dried to form the porous layer (II) directly on the surface of the porous layer (I). For example, the composition for forming the porous layer (II) may be applied to the surface of the microporous film composed mainly of the resin (A), and then dried.

In the method (d) or (f), at least one of the porous layers (I) and (II) (the porous layer (II) is selected for the method (f)) may be formed on the surface of at least one of the positive electrode and the negative electrode of the electrochemical device, so that at least one of the porous layers (I) and (II) (the porous layer (II) is selected for the method (f)) may be integrated with the electrode.

The separator is not limited to each of the configurations as described above. For example, the separator may have a configuration obtained by combining the methods (c) and (d), in which one of the porous layer (I) and the porous layer (II) is a porous matrix and the other porous layer is not a porous matrix.

Each of the porous layer (I) composed mainly of the resin (A) and the porous layer (II) composed mainly of the filler does not have to be a single layer and can be a plurality of layers in the separator. For example, the porous layers (I) may be formed on both sides of the porous layer (II). However, the thickness of the separator increases with the number of layers, which may lead to an increase in the internal resistance or a reduction in the energy density. Therefore, the separator should not include too many layers, and the number of porous layers is preferably five layers or less, and more preferably two layers.

In the separator, the resin (A) may be in the form of particles, and the individual particles may be present independently. Alternatively, a part of the particles may be fused with each other or fused with the fibrous material or the like.

The porous layer (I) and the porous layer (II) are integrally formed as an independent film constituting the separator. In addition to this, as described above, the porous layer (I) and the porous layer (II) may be independent of each other, and when the electrochemical device is assembled, the porous layers (I) and (II) are laminated together in the electrochemical device so as to function as a separator that is interposed between the positive electrode and the negative electrode. However, if the porous layers (I) and (II) are not integrally formed from the beginning, winding displacements of the porous layers (I) and (II) may occur during winding. Thus, it is preferable that the separator is an independent film formed by integrating the porous layer (I) with the porous layer (II).

The porous layer (I) and the porous layer (II) do not have to be in contact with each other, and another layer made of, e.g., the fibrous material constituting the porous matrix may be disposed between the porous layers (I) and (II).

When the separator has a configuration in which the porous layer (I) is disposed on one side of the porous layer (II), that is, e.g., a configuration in which the porous layer (I) is formed on one surface of the porous layer (II) or a configuration in which the porous layer (I) and the porous layer (II) that serve as independent films respectively are laminated together, the porous layer (I) may be located either on the positive electrode side or on the negative electrode side. In the electrochemical device of the present invention, the porous layer (I) is disposed to face the negative electrode so as to improve the safety by fulfilling the shutdown function more effectively. When the porous layer (I) is located on the negative electrode side, the resin (A) is not likely to be absorbed by the active material containing layer after a shutdown, and the molten resin (A) can efficiently fill the pores of the separator, compared to the case where the porous layer (I) is located on the positive electrode side. Therefore, when the separator comes into contact with the active material containing layer of the negative electrode, it is desirable that the electrochemical device is assembled so that the porous layer (I) is present on the surface of the separator facing the negative electrode.

When the filler used in the porous layer (II) is a material having excellent oxidation resistance (e.g., an inorganic oxide), the porous layer (II) can be disposed to face the positive electrode, thereby suppressing the oxidation of the separator due to the positive electrode. Thus, the electrochemical device can have good high-temperature storage characteristics and good charge-discharge cycle characteristics. Therefore, when the separator comes into contact with the active material containing layer of the positive electrode, it is desirable that the electrochemical device is assembled so that the porous layer (II) is present on the surface of the separator facing the positive electrode.

Hereinafter, a lithium secondary battery will be described in detail as an example of the electrochemical device of the present invention. The lithium secondary battery may be in the form of a rectangular or circular cylinder and have an outer can made of steel or aluminum. Moreover, the lithium secondary battery may be a soft package battery using a metal-deposited laminated film as an outer package.

The positive electrode is not particularly limited as long as it has been used for a conventional lithium secondary battery, that is, it contains an active material capable of intercalating and deintercalating a Li ion. Examples of the positive electrode active material include the following: a lithium-containing transition metal oxide having a layered structure expressed as $Li_{1+x}MO_2$ ($-0.1<x<0.1$, M: Co, Ni, Mn, Al, Mg, etc.); a lithium manganese oxide having a spinel structure expressed as $LiMn_2O_4$ or other formulas in which a part of the elements of $LiMn_2O_4$ is substituted with another element; and an olivine-type compound expressed as $LiMPO_4$ (M: Co, Ni, Mn, Fe, etc.). Specific examples of the lithium-containing transition metal oxide having a layered structure include $LiCoO_2$, $LiNiO_2$, and $LiNi_{1-x-y}Co_xAl_yO_2$ ($0.1 \leq x \leq 0.3$, $0.01 \leq y \leq 0.2$) and $LiNi_{1-x-y}Co_xMn_yO_2$ ($0.1 \leq x \leq 0.4$, $0.1 \leq y \leq 0.5$) that contain at least Co and Ni. More specifically, the lithium-containing transition metal oxide can have compositions such as $LiNi_{1/3}Co_{1/3}O_2$, $LiNi_{5/12}Co_{1/6}Mn_{5/12}O_2$, and $LiNi_{3/5}Co_{1/5}Mn_{1/5}O_2$.

A carbon material such as carbon black is used as a conductive assistant. A fluorocarbon resin such as polyvinylidene fluoride (PVDF) is used as a binder. Using a positive electrode mixture in which these materials are mixed with the positive electrode active material, a positive electrode active material containing layer is formed, e.g., on a current collector.

The current collector of the positive electrode may be, e.g., a metal foil, a punching metal, a mesh, or an expanded metal made of aluminum or the like. In general, an aluminum foil with a thickness of 10 to 30 µm can be suitably used.

A lead portion of the positive electrode is generally provided in the following manner. A part of the current collector remains exposed without forming the positive electrode active material containing layer when the positive electrode is produced, and thus this exposed portion can serve as the lead portion. However, the lead portion does not necessarily need to be integrated with the current collector from the beginning and may be provided by connecting an aluminum foil or the like to the current collector afterward.

The negative electrode is not particularly limited as long as it has been used for a conventional lithium secondary battery, that is, it contains an active material capable of intercalating and deintercalating a Li ion. Examples of the negative electrode active material include one type of carbon materials capable of intercalating and deintercalating lithium such as graphite, pyrolytic carbon, coke, glassy carbon, a calcined organic polymer compound, mesocarbon microbeads (MCMB), and a carbon fiber or a mixture of two or more types of the carbon materials. Moreover, examples of the negative electrode active material also include the following: elements such as Si, Sn, Ge, Bi, Sb, and In and their alloys; compounds that can be charged/discharged at a low voltage close to lithium metal such as a lithium-containing nitride and a lithium oxide; a lithium metal; and a lithium/aluminum alloy. The negative electrode may be produced in such a manner that a negative electrode mixture is obtained by adding the conductive assistant (e.g., a carbon material such as carbon black) or the binder (e.g., PVDF) appropriately to the negative electrode active material, and then formed into a compact (a negative electrode active material containing layer) while a current collector is used as a core material. Alternatively, foils of the lithium metal or various alloys as described above can be used individually or in the form of a laminate with the current collector as the negative electrode.

When the negative electrode includes a current collector, the current collector may be, e.g., a metal foil, a punching metal, a mesh, or an expanded metal made of copper, nickel, or the like. In general, a copper foil is used. If the thickness of the whole negative electrode is reduced to achieve a battery with high energy density, the current collector of the negative electrode preferably has a thickness of 5 to 30 µm. Moreover, a lead portion of the negative electrode can be formed in the same manner as that of the positive electrode.

An electrode body may be in the form of a stacked electrode formed by stacking the positive electrode and the negative electrode via the separator or in the form of a wound electrode formed by winding the stacked electrode.

The electrolyte may be a non-aqueous solution in which a lithium salt is dissolved in an organic solvent. The lithium salt is not particularly limited as long as it dissociates in the solvent to produce a $Li^+$ ion and is not likely to cause a side reaction such as decomposition in the working voltage range of a battery. Examples of the lithium salt include inorganic lithium salts such as $LiClO_4$, $LiPF_6$, $LiBF_4$, $LiAsF_6$, and $LiSbF_6$, and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 5$), and $LiN(RfOSO_2)_2$ (where Rf represents a fluoroalkyl group).

The organic solvent used for the electrolyte is not particularly limited as long as it dissolves the lithium salt and does not cause a side reaction such as decomposition in the working voltage range of a battery. Examples of the organic solvent include the following: cyclic carbonates such as an ethylene carbonate, a propylene carbonate, a butylene carbonate, and a vinylene carbonate; chain carbonates such as a dimethyl carbonate, a diethyl carbonate, and a methyl ethyl carbonate; chain ester such as methyl propionate; cyclic ester such as γ-butyrolactone; chain ether such as dimethoxyethane, diethyl ether, 1,3-dioxolane, diglyme, triglyme, and tetraglyme; cyclic ether such as dioxane, tetrahydrofuran, and 2-methyltetrahydrofuran; nitrile such as acetonitrile, propionitrile, and methoxypropionitrile; and sulfurous ester such as ethylene glycol sulfite. The organic solvent may include two or more of these materials. A combination of the materials capable of achieving a high conductivity, e.g., a mixed solvent of the ethylene carbonate and the chain carbonate is preferred for better characteristics of the battery. Moreover, to improve the safety, the charge-discharge cycle characteristics, the high-temperature storage characteristics, or the like, additives such as vinylene carbonates, 1,3-propane sultone, diphenyl disulfide, cyclohexylbenzene, biphenyl, fluorobenzene, and t-butylbenzene can be appropriately added.

The concentration of the lithium salt in the electrolyte is preferably 0.5 to 1.5 mol/L, and more preferably 0.9 to 1.25 mol/L.

The positive electrode having the positive electrode active material containing layer and the negative electrode having the negative electrode active material containing layer may be produced in the following manner. A composition (slurry etc.) for forming the positive electrode active material containing layer is prepared by dispersing the positive electrode mixture in a solvent such as N-methyl-2-pyrrolidone (NMP). A composition (slurry etc.) for forming the negative electrode active material containing layer is prepared by dispersing the negative electrode mixture in a solvent such as NMP. These compositions are applied to the current collectors, and then dried. In this case, e.g., a lithium secondary battery (electrochemical device) also can be configured using a laminated composite of the positive electrode and the porous layer (I) and/or the porous layer (II) or a laminated composite of the negative electrode and the porous layer (I) and/or the porous layer (II). The laminated composite of the positive electrode and the porous layer (I)

and/or the porous layer (II) is provided by applying the composition for forming the positive electrode active material containing layer to the current collector, and further applying the composition for forming the porous layer (I) and/or the composition for forming the porous layer (II) before the previously applied composition is dried. The laminated composite of the negative electrode and the porous layer (I) and/or the porous layer (II) is provided by applying the composition for forming the negative electrode active material containing layer to the current collector, and further applying the composition for forming the porous layer (I) and/or the composition for forming the porous layer (II) before the previously applied composition is dried.

Embodiment 2

Next, a method for manufacturing an electrochemical device of the present invention will be described from the viewpoint different from Embodiment 1. The positive electrode and the negative electrode are stacked via the separator to form an electrode body. This electrode body is used for assembly of the electrochemical device without any change in shape. Alternatively, the separator is wrapped around a winding shaft, and then further wound with the positive electrode and the negative electrode to form a spiral electrode body, which is used for assembly of the electrochemical device. However, in the case of the separator having different friction coefficients on both sides, such as the separator including the porous layer (I) on one side and the porous layer (II) on the other side, the following problems are likely to arise during the production of the spiral electrode body. If winding is performed by arranging the separator with its higher friction coefficient side facing the winding shaft, the friction between the separator and the winding shaft is increased. Therefore, the spiral electrode body thus produced will not easily slip off when it is removed from the winding shaft, or a winding displacement of the electrode may occur.

Thus, in the present invention, when the positive electrode, the negative electrode, and the separator having different friction coefficients on both sides are stacked and wound around the winding shaft in a spiral fashion to form an electrode body, it is preferable that the separator is wrapped around the winding shaft with its lower friction coefficient side facing the winding shaft.

According to a first method for manufacturing an electrochemical device of the present invention, a spiral electrode body that includes a positive electrode, a negative electrode, and a separator is produced by winding the positive electrode, the negative electrode, and the separator around a winding shaft in a spiral fashion. The separator has different friction coefficients on both sides. The first method includes wrapping the separator around the winding shaft with its lower friction coefficient side facing the winding shaft, and winding the positive electrode and the negative electrode with the separator.

When the separator includes the porous layer (I) composed mainly of the thermoplastic resin and the porous layer (II) composed mainly of the filler with a heat-resistant temperature of 150° C. or higher, as in the case of the separator used for the electrochemical device of the present invention, the coefficient of static friction between the porous layer (II) and the winding shaft tends to be larger than that between the porous layer (I) and the winding shaft. Although the coefficient of static friction varies depending on the material of the winding shaft or the like, the coefficient of static friction between the porous layer (II) and the winding shaft is, e.g., more than 0.5, and the coefficient of static friction between the porous layer (I) and the winding shaft is, e.g., 0.5 or less when the porous layer (I) is a microporous film. Therefore, when the porous layer (I) is formed on one side and the porous layer (II) is formed on the other side of the separator, the separator may be wrapped around the winding shaft with the porous layer (I) facing the winding shaft.

If the second porous layer (II) includes hard inorganic fine particles such as ceramics and is disposed to face the winding shaft during winding, not only a winding displacement of the electrode, but also an abrasion of the winding shaft by the inorganic fine particles is caused, so that the winding shaft can wear in a short period of time. Thus, aside from the problem of the friction coefficients on both sides of the separator, when the porous layer (II) includes inorganic fine particles such as ceramics, it is desirable that winding is performed by arranging the separator with the porous layer (II) facing away from the winding shaft. In this regard, according to a second method for manufacturing an electrochemical device of the present invention, a spiral electrode body that includes a positive electrode, a negative electrode, and a separator is produced by winding the positive electrode, the negative electrode, and the separator around a winding shaft in a spiral fashion. The separator includes a porous layer (I) composed mainly of a thermoplastic resin on one side and a porous layer (II) composed mainly of insulating ceramics particles with a heat-resistant temperature of 150° C. or higher on the other side. The second method includes wrapping the separator around the winding shaft with the porous layer (I) facing the winding shaft, and winding the positive electrode and the negative electrode with the separator.

The lower the coefficient of static friction between the porous layer (I) and the winding shaft is, the easier the removal of the spiral electrode body from the winding shaft becomes. Therefore, the coefficient of static friction between the porous layer (I) and the winding shaft is preferably 0.5 or less, and more preferably 0.4 or less. On the other hand, if the coefficient of static friction is too small, the separator may slide and the winding position may be shifted. Therefore, the coefficient of static friction is preferably 0.05 or more, more preferably 0.1 or more, and particularly preferably 0.2 or more. In the present specification, the coefficient of static friction can be measured according to the regulations of JIS K 7125.

Next, the method for manufacturing an electrochemical device of the present invention will be described in detail with reference to the drawings. FIG. 1 is a conceptual diagram showing an example of a manufacturing apparatus of a wound electrode body. Although FIG. 1 is not a cross-sectional view but a side view of the manufacturing apparatus, a part of the components (i.e., a negative electrode 1) is hatched so as to facilitate the understanding of the individual components.

In the manufacturing method of the present invention, a separator 3 is stacked with a negative electrode 1 and a positive electrode 2, and this stack is wound around a winding shaft 4, thereby producing a wound electrode body. In the first stage of the winding, two separators 3, 3 are superimposed and wrapped tightly around the winding shaft 4 (first step). Next, the negative electrode 1 is wrapped inside the separator 3 that is closer to the winding shaft 4 while the positive electrode 2 is wrapped between the two separators 3, 3, and then these are wound into a wound electrode body (second step). In the second step, the positive electrode 2 may be wrapped inside the separator 3 that is closer to the winding shaft 4 while the negative electrode 1 may be wrapped between the two separators 3, 3, and then these are wound into a wound electrode body. Thereafter, the wound electrode body is removed from the winding shaft 4.

Figure 2:
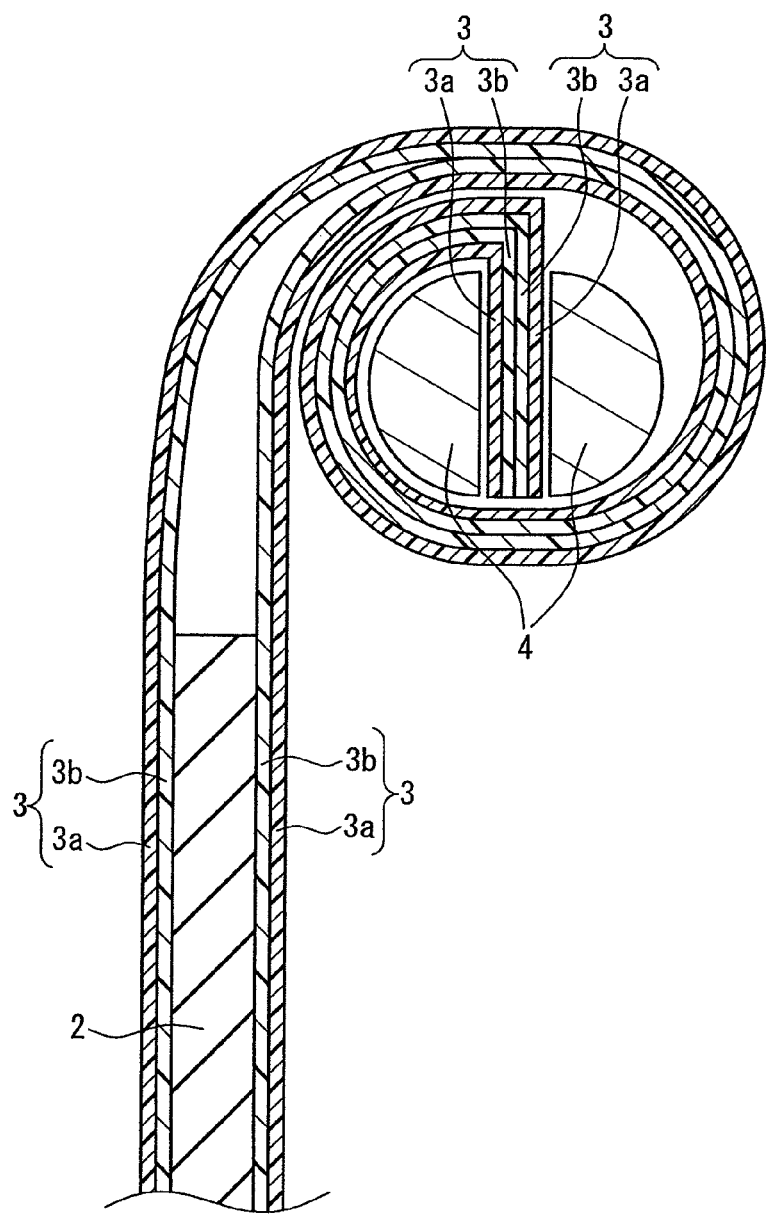
FIG. 2 is a cross-sectional view showing a portion in the vicinity of a winding shaft in the course of the processes of a method for manufacturing an electrochemical device of the present invention.

FIG. 2 is an enlarged cross-sectional view showing a portion in the vicinity of the winding shaft 4 at the beginning of the second step after the first step has been finished in the production of the wound electrode body. FIG. 2 shows a state in which the positive electrode 2 is wrapped between the two separators 3, 3 after the first step, but does not illustrate the negative electrode 1. In FIG. 2, 3$a$ denotes a lower friction coefficient side and 3$b$ denotes a higher friction coefficient side of the separator 3. Thus, each of the separators 3, 3 has different friction coefficients on both sides and is arranged with its lower friction coefficient side 3$a$ facing the winding shaft 4. This can prevent the separator from being entwined with the winding shaft 4 when the winding shaft 4 is pulled out after the wound electrode body has been formed. Accordingly, the wound electrode body can be produced with good productivity.

To manufacture an electrochemical device in which the porous layer (I) is located on the negative electrode side, the negative electrode may be wrapped so as to lie on the lower friction coefficient side, namely the porous layer (I) side of the separator in the second step. Moreover, an electrochemical device in which the porous layer (II) is located on the positive electrode side can be produced by wrapping the positive electrode so as to lie on the higher friction coefficient side, namely the porous layer (II) side of the separator.

The manufacturing method of the present invention is also applicable to any separators other than those used in the present invention, e.g., a separator in the form of a laminate that is made of a thermoplastic resin and has different friction coefficients on both sides.

Figure 3A:
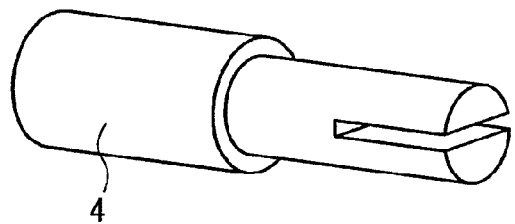
FIGS. 3A, 3B, and 3C are schematic views, each showing an example of a winding shaft that can be used in a method for manufacturing an electrochemical device of the present invention.
Figure 3B:
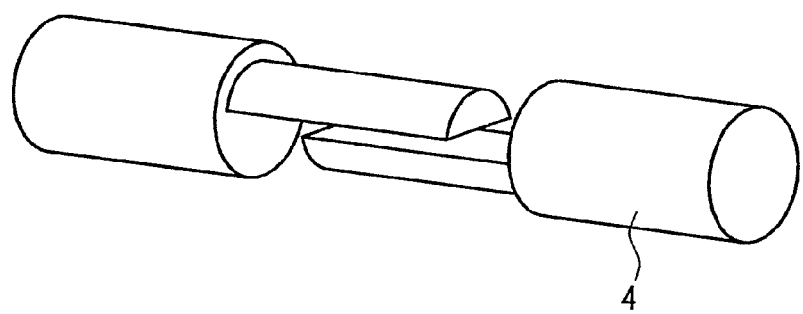
Figure 3C:
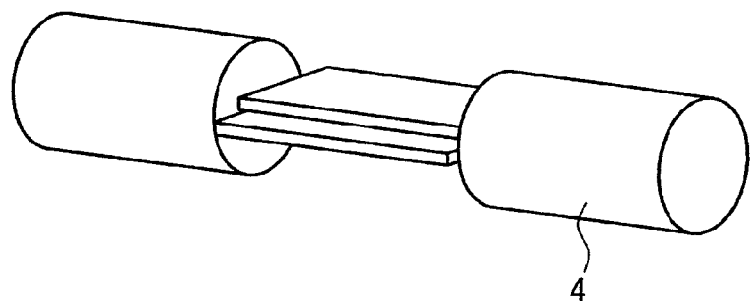

In the example of FIG. 2, the winding shaft 4 consists of two semicircular shafts. The semicircular shafts are arranged with their planes opposite to each other, and the separators 3, 3 are sandwiched between the planes. The winding shaft 4 is not limited to the shape as shown in FIG. 2 and may have any conventional shape. FIGS. 3A, 3B, and 3C schematically show specific examples of the winding shaft 4, and various types of winding shafts can be used. For example, as shown in FIG. 3A, the end of the winding shaft 4 is split into two pins. As shown in FIG. 3B, two shafts having a semicircular cross section are arranged with their planes opposite to each other, and also extend toward each other in the shorter axis direction of the surfaces of the electrode and the separator. As shown in FIG. 3C, two plate shafts suitable for the production of a wound electrode body for a rectangular electrochemical device (a rectangular battery etc.) are arranged opposite to each other.

The material of the winding shaft is not particularly limited and can be any material that has been used for the winding shaft of a wound electrode body for a conventional electrochemical device. Specifically, e.g., stainless steels (SUS303, SUS304, SUS305, SUS316, SUS317, SUS403, SUS420, etc.) can be used. Moreover, the surface of the winding shaft may be coated with ceramics such as a nitride to improve the durability.

The electrode body, together with the electrolyte, is sealed in the outer package, thus forming, e.g., a lithium secondary battery. Like the conventional lithium secondary battery, the battery may be in the form of a cylindrical battery using a circular or rectangular cylindrical outer can, a flat-shaped battery using a flat-shaped outer can (that is circular or rectangular when shown in a plan view), or a soft package battery using a metal-deposited laminated film as an outer package. The outer can is made of, e.g., steel or aluminum. It is desirable that the battery using a metal outer can includes a mechanism for discharging the gas contained in the battery to the outside when the gas pressure inside the battery is raised. For example, the mechanism may be a metal cleavable vent that cracks at a predetermined pressure, a resin vent that tears at a predetermined pressure, or a rubber vent that becomes uncovered at a predetermined pressure. In particular, the metal cleavable vent is preferred.

In the soft package battery, the joint is heat-sealed with the resin. Therefore, it is intrinsically difficult to have a structure that can resist high temperatures and high pressures when the temperature and the internal pressure of the battery are raised. Thus, even if there is no particular mechanism, the soft package battery can discharge the gas contained in the battery to the outside when the temperature is raised. In the soft package battery, the sealed portion (heat-sealed portion) of the outer package functions as a mechanism for discharging the gas contained in the battery to the outside. Moreover, by narrowing the width of the sealed portion only in a specific region, the soft package battery also can discharge the gas contained in the battery to the outside when the temperature is raised. In other words, the specific region of the sealed portion functions as a mechanism for discharging the gas contained in the battery to the outside.

In the lithium secondary battery including a mechanism for reducing the internal pressure of the battery by discharging the gas contained in the battery to the outside at the time the internal pressure is raised due to the temperature rise, when the mechanism is actuated, the non-aqueous electrolyte in the battery evaporates and the electrodes can be directly exposed to the air. This may occur while the battery is in the charged state. If the negative electrode comes into contact with the air (i.e., oxygen and moisture), the lithium ion intercalated by the negative electrode or the lithium deposited on the surface of the negative electrode reacts with the air and generates heat. Consequently, the temperature of the battery is raised even after effecting a shutdown of the separator, which in turn may cause a thermal runaway reaction of the positive electrode active material.

However, when the porous layer (I) of the separator is located on the negative electrode side, the molten resin (A) of the porous layer (I) can not only fill the pores of the separator, but also suppress the reaction of the negative electrode and the air by forming a film on the surface of the negative electrode. In particular, when the porous layer (I) comes into contact with the active material containing layer of the negative electrode, a film of the resin (A) is formed on the surface of the negative electrode active material containing layer, so that the above effect of suppressing the reaction is considered to be high. Thus, in the lithium secondary battery including a mechanism for discharging the gas contained in the battery to the outside when the gas pressure inside the battery is raised, the safety of the battery can be further improved by locating the porous layer (I) on the negative electrode side.

The types of electrochemical devices to be manufactured by the method of the present invention are not particularly limited. In addition to the lithium secondary battery using a non-aqueous electrolyte, the manufacturing method of the present invention is also applicable to conventional electrochemical devices such as a lithium primary battery and a capacitor, and particularly preferably to those requiring safety at high temperatures. There is no particular limitation to the configuration/structure of the electrochemical device of the present invention as long as it includes the separator of the present invention. Accordingly, the electrochemical device of the present invention can employ various configurations/structures of various conventional electrochemical devices using a non-aqueous electrolyte (such as a lithium secondary battery, a lithium primary battery, and a capacitor).

Hereinafter, the present invention will be described in detail by way of examples. In the following examples, when a porous matrix (nonwoven fabric) is used, the volume content of each component in the porous layer (I) and the porous layer (II) is expressed as the ratio of the volume of each component to the volume of all components except the porous matrix. The volume content was calculated, where SBR had a specific gravity of 0.97 g/cm$^3$, boehmite had a specific gravity of 3.0 g/cm$^3$, PE had a specific gravity of 1.0 g/cm$^3$, and alumina had a specific gravity of 4.0 g/cm$^3$.

In the following examples, the coefficient of static friction between the separator and the winding shaft was measured according to the regulations of JIS K 7125 by using SUS 304 as the material of the winding shaft. The melting point (melting temperature) of the resin (A) was measured with a DSC according to the regulations of JIS K 7121.

Production 1 of Negative Electrode (Manufacturing Example 1)

A negative electrode mixture containing paste was prepared by mixing 95 parts by mass of graphite (negative electrode active material) and 5 parts by mass of PVDF (binder) uniformly by using N-methyl-2-pyrrolidone (NMP) as a solvent. This negative electrode mixture containing paste was intermittently applied to both surfaces of a current collector (copper foil) with a thickness of 10 μm so that the applied length of the active material was 320 mm on the upper surface and 260 mm on the lower surface, which then was dried and calendered. The thicknesses of the negative electrode mixture layers were adjusted so that the total thickness was 142 μm. Subsequently, this current collector having the negative electrode mixture layers was cut into a width of 45 mm, thus producing a negative electrode with a length of 330 mm and a width of 45 mm. Moreover, a lead portion was formed by welding a tab to the exposed portion of the copper foil of the negative electrode.

Production 1 of Positive Electrode (Manufacturing Example 2)

A positive electrode mixture containing paste was prepared by mixing 85 parts by mass of LiCoO$_2$ (positive electrode active material), 10 parts by mass of acetylene black (conductive assistant), and 5 parts by mass of PVDF (binder) uniformly by using NMP as a solvent. This positive electrode mixture containing paste was intermittently applied to both surfaces of a current collector (aluminum foil) with a thickness of 15 μm so that the applied length of the active material was 320 mm on the upper surface and 260 mm on the lower surface, which then was dried and calendered. The thicknesses of the positive electrode mixture layers were adjusted so that the total thickness was 150 μm. Subsequently, this current collector having the positive electrode mixture layers was cut into a width of 43 mm, thus producing a positive electrode with a length of 330 mm and a width of 43 mm. Moreover, a lead portion was formed by welding a tab to the exposed portion of the aluminum foil of the positive electrode.

Example 1

1000 g of alumina (filler) with an average particle size of 0.3 μm, 800 g of water, 200 g of isopropyl alcohol (IPA), and 375 g of a water/IPA solution of polyvinyl butyral (binder) having a solid content of 15% were put in a container, and stirred with a Three-One Motor for 1 hour and dispersed, resulting in a uniform slurry (slurry 1). A PET nonwoven fabric with a thickness of 12 μm and a weight of 8 g/m$^2$ was immersed in and removed from the slurry 1, and thus the slurry 1 was applied to the nonwoven fabric. This nonwoven fabric was allowed to pass through a predetermined gap and then dried, thereby providing a porous film (porous layer (II)) with a thickness of 20 μm. A water dispersion of a PE powder (with an average particle size of 1 μm and a solid concentration of 40%) was applied to one surface of the porous film using a blade coater and then dried, so that a PE fine particle layer (porous layer (I)) was formed to have a thickness of 5 μm. In this manner, a separator with different friction coefficients on both sides was produced.

Next, using the manufacturing apparatus having the configuration as shown in FIG. 1, the negative electrode obtained by the manufacturing example 1, the positive electrode obtained by the manufacturing example 2, and the separator of this example were wound around the winding shaft that was made of stainless steel (SUS304) and had the structure as shown in FIG. 3B, so that a wound electrode body was produced. The separator was arranged with its lower friction coefficient side (i.e., the porous layer (I)) facing the winding shaft. Then, 100 wound electrode bodies were produced, and the proportion of the electrode bodies that could not be normally removed from the winding shaft was determined and evaluated as percent defective.

Example 2

The slurry 1 prepared in Example 1 was applied to one surface of a PE microporous film (porous layer (I)) with a thickness of 16 μm using a blade coater and then dried, so that an inorganic filler layer (porous layer (II)) was formed to have a thickness of 5 μm. Thus, a separator with different friction coefficients on both sides was produced. Then, 100 wound electrode bodies were produced in the same manner as Example 1 except that this separator was used, and the percent defective in the removal of the electrode bodies was measured.

Comparative Example 1

100 wound electrode bodies were produced in the same manner as Example 1 except that the separator was arranged with its higher friction coefficient side (i.e., the porous layer (II)) facing the winding shaft, and the percent defective in the removal of the electrode bodies was measured.

Comparative Example 2

100 wound electrode bodies were produced in the same manner as Example 2 except that the separator was arranged with its higher friction coefficient side (i.e., the porous layer (II)) facing the winding shaft, and the percent defective in the removal of the electrode bodies was measured.

Table 1 shows the percent defective in the removal of the electrode bodies in Examples 1-2 and Comparative Examples 1-2. Table 1 also shows the type of the surface of the separator in contact with the winding shaft and the coefficient of static friction between the separator and SUS304 as the material of the winding shaft in each of the examples.

TABLE 1

| | Surface of separator in contact with winding shaft | Coefficient of static friction between separator and material of winding shaft | Percent defective (%) |
|---|---|---|---|
| Example 1 | Porous layer (I) | 0.10 | 0 |
| Example 2 | Porous layer (I) | 0.16 | 0 |
| Comparative Example 1 | Porous layer (II) | 1.1 | 90 |
| Comparative Example 2 | Porous layer (II) | 1.1 | 93 |

As shown in Table 1, all the wound electrode bodies of Examples 1 to 2, which were produced by using the separator with different friction coefficients on both sides and arranging the separator with its lower friction coefficient side facing the winding shaft, could be normally removed from the winding shaft. Moreover, these electrode bodies were produced with good productivity without causing any winding displacement. Therefore, it is evident that the manufacturing method of the present invention can improve the productivity of the electrochemical device.

Example 3

A water dispersion of PE fine particles (with an average particle size of 1 μm, a solid concentration of 40%, a melting point of 125° C., and a melt viscosity of the resin of 1300 mPa·s) (liquid composition (1-A)) was applied to both surfaces of the negative electrode obtained by the manufacturing example 1 using a blade coater and then dried, so that porous layers (I) composed mainly of PE (i.e., the resin (A)) were formed to have a thickness of 7 μm. In this case, the porous layers (I) formed on the negative electrode included only the PE fine particles, i.e., the resin (A), and thus the volume content of the resin (A) in each of the porous layers (I) was 100%.

Next, 1000 g of plate-like boehmite (with an average particle size of 1 μm and an aspect ratio of 10) were dispersed as a filler in 1000 g of water, to which 120 g of SBR latex (organic binder) was added and uniformly dispersed, resulting in a liquid composition (2-A). APE meltblow nonwoven fabric with a thickness of 15 μm was immersed in and removed from the liquid composition (2-A), and thus the slurry was applied to the nonwoven fabric. Then, this nonwoven fabric was dried, thereby providing a porous film (porous layer (II)) that had a thickness of 20 μm and included a layer composed mainly of the filler particles present in the pores of the nonwoven fabric. The calculated volume content of the plate-like boehmite in the porous layer (II) was 87%.

The positive electrode obtained by the manufacturing example 2, the negative electrode having the porous layer (I), and the porous film that was to be the porous layer (II) were wound in a spiral fashion, so that an electrode body was produced. This substantially cylindrical electrode body was pressed into a flat shape and placed in an aluminum laminated outer package. Moreover, the following electrolyte was injected, and then the outer package was sealed, resulting in a lithium secondary battery. The electrolyte was a non-aqueous electrolyte obtained by dissolving $LiPF_6$ at a concentration of 1.2 mol/L in a solvent containing an ethylene carbonate and a methyl ethyl carbonate at a volume ratio of 1:2. In this example, the porous layer (I) formed on the negative electrode and the porous layer (II) (porous film) using the nonwoven fabric as a base material were laminated together in the battery so as to function as a separator. Incidentally, in this example and each of the following examples, the combination of the porous layer (I) and the porous layer (II) is referred to as a separator.

Example 4

2000 g of a water dispersion of PE fine particles (with an average particle size of 1 μm, a solid concentration of 40%, a melting point of 125° C., and a melt viscosity of the resin of 1300 mPa·s) and 800 g of ethanol were put in a container, stirred with a Disper at 2800 rpm for 1 hour, and dispersed. Then, 4400 g of plate-like alumina ($Al_2O_3$) fine particles (with an average particle size of 2 μm and an aspect ratio of 50) were added as filler particles to the above dispersion and stirred for 3 hours, resulting in a uniform slurry (liquid composition (2-B)). Using a die coater provided with two opposing dies, the liquid composition (2-B) and the liquid composition (1-A) used in Example 1 were simultaneously applied to a PET wet-laid nonwoven fabric with a thickness of 18 μm and dried, thereby producing a separator that included the porous layer (I) composed mainly of PE (i.e., the resin (A)) and the porous layer (II) composed mainly of the plate-like alumina fine particles (i.e., the filler). Each of the porous layer (I) and the porous layer (II) had a thickness of about 10 μm. The volume content of PE, i.e., the resin (A) in the porous layer (I) was 100%, and the calculated volume content of the plate-like alumina fine particles in the porous layer (II) was 58%.

The negative electrode obtained by the manufacturing example 1, the separator of this example, and the positive electrode obtained by the manufacturing example 2 were stacked with the porous layer (I) of the separator facing the negative electrode, and then wound in a spiral fashion, so that an electrode body was produced. In this winding, the separator was arranged so that the porous layer (I) came into contact with the winding shaft. Subsequently, a lithium secondary battery was produced in the same manner as Example 3.

Example 5

The PET nonwoven fabric used in Example 4 was also used as a porous matrix, and this porous matrix was immersed in and removed from the liquid composition (2-B) used in Example 4 in the same manner as Example 3, thereby providing a porous layer (II) with a thickness of 20 μm. Moreover, a liquid composition (1-B) having the same configuration as the liquid composition (1-A) except that the melt viscosity of the PE fine particles was 10000 mPa·s was produced, applied to one surface of the porous layer (II) using a blade coater and then dried, so that a porous layer (I) with a thickness of 7 μm was formed. Thus, a separator was produced. Subsequently, a lithium secondary battery was produced in the same manner as Example 4 except that this separator was used. The volume content of PE, i.e., the resin (A) in the porous layer (I) was 100%, and the calculated volume content of the plate-like alumina fine particles in the porous layer (II) was 58%.

Comparative Example 3

A lithium secondary battery was produced in the same manner as Example 5 except that the separator was arranged with the porous layer (I) facing the positive electrode in producing the wound electrode body.

Example 6

A liquid composition (2-C) was prepared in the same manner as Example 4 except that boehmite having a secondary particle structure (with an average particle size of the secondary particles of 0.6 μm and a specific surface area of 15 m²/g) was used instead of the plate-like alumina fine particles. A separator was produced in the same manner as Example 5 except that the liquid composition (2-C) was used instead of the liquid composition (2-B). A lithium secondary battery was produced in the same manner as Example 5 except that this separator was used.

Comparative Example 4

A separator was produced in the same manner as Example 5 except that a water dispersion of carnauba wax (with an average particle size of 0.4 μm, a solid concentration of 30 mass %, a melting point of 80° C., and a melt viscosity of 25 mPa·s) was used instead of the liquid composition (1-B). A lithium secondary battery was produced in the same manner as Comparative Example 3 except that this separator was used.

Comparative Example 5

Using a PE microporous film with a thickness of 20 μm, the negative electrode obtained by the manufacturing example 1 and the positive electrode obtained by the manufacturing example 2 were stacked via the PE microporous film and wound in a spiral fashion, so that an electrode body was produced. A lithium secondary battery was produced in the same manner as Example 3 except that this electrode body was used.

Table 2 shows the configurations of the separators produced in Examples 3-6 and Comparative Examples 3-5. In Table 2, the resin ratio indicates the ratio of the volume of the resin (A) included in the porous layer (I) to the volume of the pores of the porous layer (II). The resin ratio is 100% when the volume of the resin (A) is equal to that of the pores. The porosity is determined by the above formula (1).

TABLE 2

|  | Porous layer (I) | | Porous layer (II) | |
|---|---|---|---|---|
|  | Resin (A) (melt viscosity) | Resin ratio (%) | Filler | Porosity (%) |
| Example 3 | PE fine particles (1300 mPa · s) | 70 | Plate-like boehmite | 25 |
| Example 4 | PE fine particles (1300 mPa · s) | 143 | Plate-like alumina | 35 |
| Example 5 | PE fine particles (10000 mPa · s) | 65 | Plate-like alumina | 25 |
| Example 6 | PE fine particles (10000 mPa · s) | 50 | Secondary particle boehmite | 35 |
| Comparative Example 3 | PE fine particles (10000 mPa · s) | 65 | Plate-like alumina | 35 |
| Comparative Example 4 | carnauba wax (25 mPa · s) | 70 | Plate-like alumina | 27 |
| Comparative Example 5 | PE microporous film | | | |

Each of the lithium secondary batteries of Examples 3-6 and Comparative Examples 3-5 were evaluated as follows. First, the shutdown temperature of the separator used in each of the lithium secondary batteries of Examples 3-6 and Comparative Examples 3-5 was determined in the following manner. Each of the batteries was placed in a thermostatic bath and heated by raising the temperature from 30° C. to 150° C. at a rate of 1° C. per minute. During the heating, changes in the internal resistance of the battery were measured, and a temperature at which the internal resistance was increased to at least five times larger than the resistance value at 30° C. was defined as the shutdown temperature. When the temperature reached 150° C., it was maintained for 30 minutes, and the surface temperature of the battery and the battery voltage were measured to investigate whether there was an anomaly.

Next, the following nail penetration test was conducted using the batteries other than those used in the above measurement. The batteries of Examples 3-6 and Comparative Examples 3-5 were charged to 4.2 V at a constant current of 0.5 C, and further charged at a constant voltage of 4.2 V until the current was reduced to 0.05 C. After charging, a 5 mm diameter nail was stuck in each of the batteries at a rate of 40 mm/sec, and the temperature rise of each of the batteries was examined. Three batteries for each example were tested, and the average of the maximum temperatures the individual batteries reached was determined as a battery temperature in the nail penetration test. Table 3 shows the results of the evaluation.

TABLE 3

|  | Electrode located opposite to porous layer (I) | Shutdown temperature (° C.) | High-temperature storage test (at 150° C. for 30 minutes) | Battery temperature (° C.) in nail penetration test |
|---|---|---|---|---|
| Example 3 | Negative electrode | 122 | No anomaly | 130 |
| Example 4 | Negative electrode | 122 | No anomaly | 130 |
| Example 5 | Negative electrode | 122 | No anomaly | 125 |
| Example 6 | Negative electrode | 125 | No anomaly | 145 |
| Comparative Example 3 | Positive electrode | 125 | No anomaly | 150 |
| Comparative Example 4 | Positive electrode | 82 | The temperature was raised. | 160 |
| Comparative Example 5 | — | 137 | The voltage was reduced. | 130 |

As shown in Table 3, in the lithium secondary batteries of Examples 3-6 and Comparative Examples 3-5, a shutdown occurred in the temperature range suitable for ensuring the safety of the battery at high temperatures. Moreover, in the batteries of Examples 3-6, in each of which the porous layer (I) was located on the negative electrode side, even if the batteries were held at 150° C. for 30 minutes, anomalies such as a rise in surface temperature of the battery and a reduction in voltage of the battery were not observed. Further, in the batteries of Examples 3-6, the temperature rise was suppressed in the nail penetration test, and the shutdown function was performed more effectively compared to the batteries of Comparative Examples 3 and 4, in each of which the porous layer (I) was located on the positive electrode side.

In Comparative Example 3 in which the melt viscosity of the resin (A) of the porous layer (I) at 140° C. was increased, the shutdown function was performed more effectively compared to Comparative Example 4. Therefore, it is evident that an increase in the melt viscosity of the resin (A) is effective in improving the safety at high temperatures.

In the battery of Comparative Example 5, the voltage was reduced while the battery was held at 150° C. for 30 minutes. This may be because a short circuit was caused in part between the positive electrode and the negative electrode by shrinkage of the separator.

Production 2 of Negative Electrode (Manufacturing Example 3)

A negative electrode with a length of 510 mm and a width of 45 mm was produced in the same manner as the manufacturing example 1 except that the negative electrode mixture containing paste was intermittently applied so that the applied length of the active material was 500 mm on the upper surface and 440 mm on the lower surface. Moreover, a lead portion was formed by welding a tab to the exposed portion of the copper foil of the negative electrode.

Production 2 of Positive Electrode (Manufacturing Example 4)

A positive electrode with a length of 520 mm and a width of 43 mm was produced in the same manner as the manufacturing example 2 except that the positive electrode mixture containing paste was intermittently applied so that the applied length of the active material was 500 mm on the upper surface and 425 mm on the lower surface. Moreover, a lead portion was formed by welding a tab to the exposed portion of the aluminum foil of the positive electrode.

Example 7

100 g of an emulsion of SBR (organic binder) with a solid content of 40 mass % and 4000 g of water were put in a container and stirred at room temperature until they were uniformly dispersed. Then, 4000 g of a plate-like boehmite powder (with an average particle size of 1 μm and an aspect ratio of 10) was added to this dispersion at four different times, and stirred with a Disper at 2800 rpm for 5 hours, resulting in a uniform slurry. Next, the slurry was applied to one surface of a polyethylene microporous film (with a porosity of 40%, an average pore diameter of 0.02 μm, and a melting point of 135° C.) that had a thickness of 16 μm and was to be the porous layer (I) using a micro-gravure coater and then dried, thereby providing a porous layer (II). Thus, a separator with a thickness of 22 μm was produced. The volume content of the filler in the porous layer (II) of the separator was 97 vol %, and the porosity of the porous layer (II) was 48%.

Figure 4A:
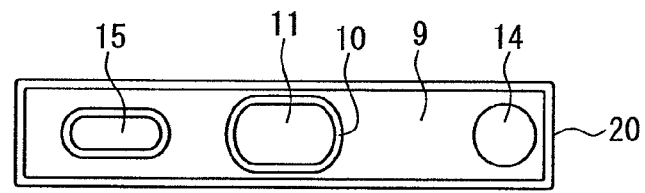
FIG. 4A is a plan view showing an example of an electrochemical device of the present invention.
Figure 4B:
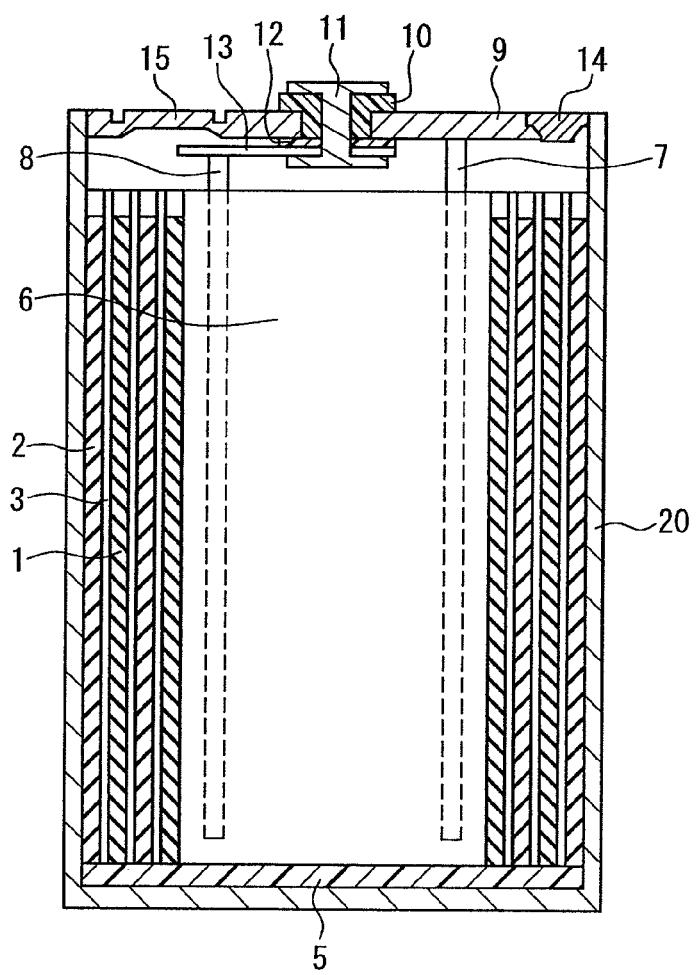
FIG. 4B is a cross-sectional view of FIG. 4A.
Figure 5:
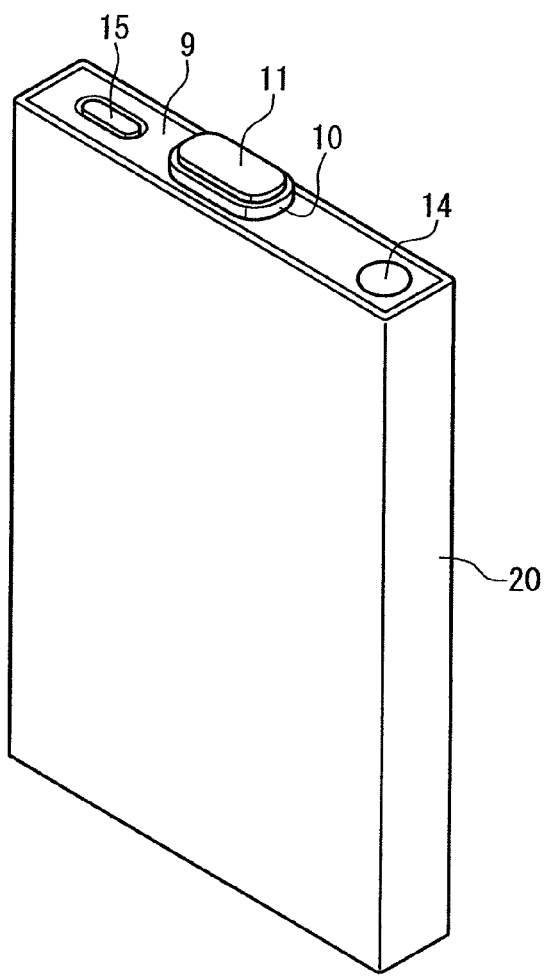
FIG. 5 is a perspective view of the electrochemical device shown in FIGS. 4A and 4B.

The negative electrode obtained by the manufacturing example 3, the separator of this example, and the positive electrode obtained by the manufacturing example 4 were stacked with the porous layer (I) of the separator facing the negative electrode, and then wound in a spiral fashion, so that an electrode body was produced. This substantially cylindrical electrode body was pressed into a flat shape and placed in an aluminum outer can with a thickness of 6 mm, a height of 50 mm, and a width of 34 mm. Moreover, the same electrolyte as that used in Example 3 was injected, and then the outer can was sealed, resulting in a lithium secondary battery having the structure as shown in FIGS. 4A, 4B and the appearance as shown in FIG. 5. A cleavable vent is provided in the upper portion of the battery to reduce the pressure when the internal pressure of the battery was raised.

Hereinafter, the battery as shown in FIGS. 4A, 4B, and 5 will be described. The negative electrode 1 and the positive electrode 2 are wound via the separator 3 in a spiral fashion, and then pressed into a flat shape, thereby providing an electrode body 6. The electrode body 6, together with an electrolyte, is housed in a rectangular cylindrical outer can 20. For the sake of simplicity, FIG. 4B does not illustrate a metal foil that is a current collector of the negative electrode 1 or the positive electrode 2, an electrolyte, etc. and also does not show the cross sections of the center of the electrode body 6 and the separator 3.

The outer can 20 is made of an aluminum alloy, serves as an outer package of the battery, and is also used as a positive terminal. An insulator 5 made of a polyethylene sheet is placed at the bottom of the outer can 20. A negative electrode lead 8 and a positive electrode lead 7 connected to the respective ends of the negative electrode 1 and the positive electrode 2 are drawn from the electrode body 6 including the negative electrode 1, the positive electrode 2, and the separator 3. A stainless steel terminal 11 is attached to a cover 9 via a polypropylene insulating packing 10. The cover 9 is made of an aluminum alloy and used to seal the opening of the outer can 20. A stainless steel lead plate 13 is connected to the terminal 11 via an insulator 12.

The cover 9 is inserted in the opening of the outer can 20, and the joint between them is welded to seal the opening, so that the inside of the battery is hermetically sealed. Moreover, the cover 9 has an inlet 14 through which the non-aqueous electrolyte is injected. The inlet 14 is sealed with a sealing member by laser welding or the like. Thus, the sealing properties of the battery are ensured. For convenience, in the battery as shown in FIGS. 4A, 4B, and 5, the inlet 14 includes the sealing member as well as itself. The cover 9 has a cleavable vent 15 as a mechanism for discharging the gas contained in the battery to the outside at the time the internal pressure is raised due to a rise in temperature or the like.

In the battery of Example 7, the positive electrode lead 7 is directly welded to the cover 9, so that the outer can 20 and the cover 9 can function as a positive terminal. Moreover, the negative electrode lead 8 is welded to the lead plate 13, and thus electrically connected to the terminal 11 via the lead plate 13, so that the terminal 11 can function as a negative terminal. However, the positive and negative electrodes may be reversed depending on the material of the outer can 20 or the like.

FIG. 5 is a schematic perspective view of the appearance of the battery shown in FIGS. 4A and 4B. FIG. 5 is intended to illustrate that the battery is in the form of a rectangular battery and only schematically shows the battery.

Example 8

A lithium secondary battery was produced in the same manner as Example 7 except that boehmite (with an average particle size of 0.6 μm) having a secondary particle structure in which the secondary particles are formed by the agglomeration of primary particles was used instead of the plate-like boehmite powder of the porous layer (II). The total thickness of the separator included in this lithium secondary battery was 22 μm. The volume content of the filler in the porous layer (II) was 97 vol %, and the porosity of the porous layer (II) was 44%.

Example 9

A lithium secondary battery was produced in the same manner as Example 7 except that granular alumina (with an average particle size of 0.4 μm) was used instead of the plate-like boehmite powder of the porous layer (II). The total thickness of the separator included in this lithium secondary battery was 20 μm. The volume content of the filler in the porous layer (II) of the separator was 96 vol %, and the porosity of the porous layer (II) was 55%.

Example 10

A lithium secondary battery was produced in the same manner as Example 7 except that a microporous film having a three-layer (PP/PE/PP) structure (with a thickness of 16 μm, a porosity of 43%, an average pore diameter of 0.008 μm, a melting point of PE of 135° C., and a volume content of PE of 33 vol %) was used instead of the microporous film of the porous layer (I). The total thickness of the separator included in this lithium secondary battery was 22 μm. The volume content of the filler in the porous layer (II) of the separator was 97 vol %, and the porosity of the porous layer (II) was 48%.

Example 11

The same slurry for forming the porous layer (II) as that prepared in Example 7 was applied to the surfaces of the positive electrode obtained by the manufacturing example 4 using a micro-gravure coater and then dried, thereby providing porous layers (II) on both surfaces of the positive electrode. The thickness of each of the porous layers (II) was 5 μm. The volume content of the filler in the porous layer (II) was 97 vol %, and the porosity of the porous layer (II) was 48%.

A lithium secondary battery was produced in the same manner as Example 7 except that the positive electrode having the porous layers (II) on both surfaces, the PE microporous film used in Example 7, and the negative electrode obtained by the manufacturing example 3 were stacked and wound. In the battery of this example, the porous layer (I) was in contact with the negative electrode mixture layer. Moreover, the PE microporous film of the porous layer (I) and the porous layer (II) were not integrally formed, but laminated together in the battery so as to function as a separator.

Example 12

A PET nonwoven fabric (with a thickness of 12 μm and a weight of 8 g/m$^2$) was used as a base material. The PET nonwoven fabric was immersed in and removed from the same slurry for forming the porous layer (II) as that prepared in Example 7 and then dried, thereby providing a porous layer (II) with a thickness of 20 μm. The volume content of the filler in the porous layer (II) was 97 vol %, and the porosity of the porous layer (II) was 33%.

A lithium secondary battery was produced in the same manner as Example 7 except that the positive electrode obtained by the manufacturing example 4, the porous layer (II) of this example, the PE microporous film used in Example 7, and the negative electrode obtained by the manufacturing example 3 were stacked and wound. In the battery of this example, the porous layer (I) was in contact with the negative electrode mixture layer. Moreover, the PE microporous film of the porous layer (I) and the porous layer (II) were not integrally formed, but laminated together in the battery so as to function as a separator.

Example 13

Like Example 12, the PET nonwoven fabric was immersed in and removed from the slurry for forming the porous layer (II). Before the slurry was dried completely, the PET nonwoven fabric was laminated with the same PE microporous film as that used in Example 12 and then dried, thereby producing a separator in which the porous layer (I) and the porous layer (II) were integrally formed. The total thickness of the separator was 33 μm. The volume content of the filler in the porous layer (II) was 97 vol %, and the porosity of the porous layer (II) was 33%. A lithium secondary battery was produced in the same manner as Example 7 except that this separator was used.

Comparative Example 6

A lithium secondary battery was produced in the same manner as Example 7 except that the porous layer (I) of the separator was located on the positive electrode side during the production of the electrode body.

The thermal shrinkage ratios of the separators used for producing the lithium secondary batteries of Examples 7-13 and Comparative Example 6 were measured by allowing the separators to stand in a thermostatic bath at 150° C. for 3 hours.

The thermal shrinkage ratio of each of the separators was measured in the following manner. A test piece was prepared by cutting the separator into 4 cm×4 cm. The test piece was interposed between two glass plates that had a thickness of 5 mm and were fixed with clips. This test piece was allowed to stand in a thermostatic bath at 150° C. for 3 hours, and then taken out of the thermostatic bath. The length of each test piece was measured and compared to that of each test piece before conducting the test. Consequently, the ratio of decrease in length was calculated as a thermal shrinkage ratio. The thermal shrinkage ratio of the separator of Example 11 was measured using the positive electrode integrated with the porous layer (II). In Example 12, the thermal shrinkage ratio of the porous layer (II) that had a smaller degree of thermal shrinkage was determined as a thermal shrinkage ratio of the separator. Table 4 shows the results of the measurement of the thermal shrinkage ratio of each separator.

TABLE 4

|  | Thermal shrinkage ratio |
| --- | --- |
| Example 7 | 1% |
| Example 8 | 1% |
| Example 9 | 1% |
| Example 10 | 0% |
| Example 11 | 0% |
| Example 12 | 0% |
| Example 13 | 0% |
| Comparative Example 6 | 1% |

As shown in Table 4, all the thermal shrinkage ratios of the separators used in the lithium secondary batteries of Examples 7-13 and Comparative Example 6 were 1% or less at 150° C.

Next, each of the lithium secondary batteries of Examples 7-13 and Comparative Example 6 was charged under the following conditions. Then, the charge capacity and the discharge capacity were determined for each of the batteries, and the ratio of the discharge capacity to the charge capacity was evaluated as charging efficiency. In this measurement, a constant-voltage and constant-current charge was performed, that is, a constant-current charge was performed at a current value of 0.2 C until the battery voltage reached 4.2 V, and subsequently a constant-voltage charge was performed at a voltage of 4.2 V. The total charge time was 15 hours.

Each of the charged batteries was then discharged at a discharge current of 0.2 C until the battery voltage was reduced to 3.0 V. Consequently, the charging efficiency of each of the batteries of Examples 7-13 and Comparative Example 6 was approximately 100%, and the formation of lithium dendrites was suppressed during charging. Thus, it was confirmed that all the batteries of Examples 7-13 and Comparative Example 6 operated favorably.

The following shutdown temperature measurement, high-temperature storage test, and external short circuit test were conducted on each of the lithium secondary batteries of Examples 7-13 and Comparative Example 6. Table 5 shows the results.

<Shutdown Temperature Measurement>

Each of the batteries in the charged state was placed in a thermostatic bath and heated by raising the temperature from 30° C. to 150° C. at a rate of 5° C. per minute, and changes in the internal resistance of the battery with temperature were determined. Then, a temperature at which the internal resistance was increased to at least five times larger than the resistance value at 30° C. was defined as the shutdown temperature.

<High-Temperature Storage Test>

For the batteries different from those used in the shutdown temperature measurement, a constant-voltage and constant-current charge was performed under the following conditions. First, a constant-current charge was performed at a current value of 0.2 C until the battery voltage reached 4.25 V, and subsequently a constant-voltage charge was performed at a voltage of 4.25 V. The total charge time was 15 hours. Each of the batteries charged under these conditions was heated by raising the temperature from 30° C. to 150° C. at a rate of 5° C. per minute, and subsequently allowed to stand at 150° C. for 3 hours. Then, the surface temperature of the battery and the battery voltage were measured to investigate whether there was an anomaly.

<External Short Circuit Test>

For the batteries different from those used in the shutdown temperature measurement and the high-temperature storage test, an external short circuit test was conducted by making a short circuit between the positive electrode and the negative electrode via 100 mΩ resistance. After the short circuit, the surface temperature of each of the batteries was measured, and the maximum temperature the battery reached was determined as a battery temperature in the external short circuit test.

TABLE 5

|  | Shutdown temperature (° C.) | High-temperature storage test (at 150° C. for 3 hours) | Battery temperature (° C.) in external short circuit test |
| --- | --- | --- | --- |
| Example 7 | 131 | No anomaly | 120 |
| Example 8 | 131 | No anomaly | 120 |
| Example 9 | 131 | No anomaly | 120 |
| Example 10 | 127 | No anomaly | 120 |
| Example 11 | 131 | No anomaly | 120 |
| Example 12 | 131 | No anomaly | 120 |
| Example 13 | 135 | No anomaly | 120 |
| Comparative Example 6 | 131 | The temperature was raised after 90 minutes. | 120 |

As shown in Table 5, in the lithium secondary batteries of Examples 7-13 and Comparative Example 6, a shutdown occurred in the temperature range suitable for ensuring the safety of the battery at high temperatures. Moreover, in the batteries of Examples 7-13, anomalies such as a rise in surface temperature of the battery and a reduction in voltage of the battery were not observed during the high-temperature storage test at 150° C. for 3 hours.

However, in the battery of Comparative Example 6, the surface temperature of the battery was raised after 90 minutes from the start of the high-temperature storage test. Careful observation of this battery during the test showed that the cleavable vent opened to reduce the internal pressure after about 75 minutes from the start of the test, and therefore the surface temperature of the battery was temporarily reduced. However, the battery temperature was raised afterward. In the battery of Comparative Example 6, since the porous layer (I) was located on the positive electrode side, the surface of the negative electrode mixture layer was not covered with the resin (A). Thus, it was impossible to prevent a reaction between the air that flowed into the battery after the cleavable vent opened and the lithium ion intercalated by the negative electrode active material (graphite). For this reason, the battery temperature was assumed to be raised.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

As described above, the present invention can provide an electrochemical device with excellent safety at high temperatures. Moreover, the productivity of the electrochemical device can be improved using a method for manufacturing the electrochemical device of the present invention.

The invention claimed is:

1. A method for manufacturing an electrochemical device comprising a spiral electrode body that comprises a positive electrode, a negative electrode, and a pair of separators, each of which includes a first porous layer having a shutdown function and a second porous layer integrated with the first porous layer, the method comprising:
lapping the pair of separators one over the other so that the second porous layers of the respective separators are arranged inside, and wrapping the lapped separators around a winding shaft with the first porous layer facing the winding shaft;
winding the positive electrode and the negative electrode with the pair of separators to form the spiral electrode body; and
removing the wound electrode body from the winding shaft,
wherein
the first porous layer of each of the separators contains 50 vol % or more of a thermoplastic resin and the second porous layer of each of the separators contains an insulating filler with a heat-resistant temperature of 150° C. or higher and an organic binder for binding insulating filler particles, a content of the insulating filler in the second porous layer being 50 vol % or more.

2. The method according to claim 1, wherein a coefficient of static friction between the first porous layer of each of the separators and the winding shaft is 0.5 or less.

3. The method according to claim 1, wherein a coefficient of static friction between the first porous layer of each of the separators and the winding shaft is 0.05 or more.

4. The method according to claim 1, wherein a material of the winding shaft is stainless steel or ceramic-coated stainless steel.

5. The method according to claim 1, wherein a thermal shrinkage ratio of the separator is 5% or less at 150° C.

6. The method according to claim 1, wherein the insulating filler is inorganic particles.

7. The method according to claim 1, wherein the first porous layer of each of the separators is a microporous film, and the microporous film is a polyolefin microporous film or a laminated porous film including a thermoplastic resin with a melting point of 80° C. to 140° C. and a thermoplastic resin with a melting point of higher than 140° C.

8. The method according to claim 1, wherein the thermoplastic resin includes polyethylene having a molecular weight of 2000 to 100000.

9. The method according to claim 1, wherein a content of the insulating filler in the second porous layer of each of the separators is 70 vol % or more.

10. The method according to claim 1, wherein a shutdown temperature determined by a change in internal resistance with temperature is 127° C. to 150° C.

11. The method according to claim 1, wherein the first porous layer of each of the separators contains, as the thermoplastic resin, a resin having a melting point of 100 to 140° C. and a melt viscosity of 1000 mPa·s or more at 140° C.

12. The method according to claim 1, wherein the first porous layer of each of the separators contains, as the thermoplastic resin, a resin having a melting point of 100 to 140° C. and a melt viscosity of 1000000 mPa·s or less at 140° C.

13. The method according to claim 1, wherein the positive electrode is arranged inside the pair of separators.

14. The method according to claim 1, wherein X is more than 5 μm and 30 μm or less, Y is 1 μm or more and 10 μm or less, and X/Y is more than ½ and 10 or less, where X (μm) represents a thickness of the first porous layer and Y (μm) represents a thickness of the second porous layer of each of the separators.

15. The method according to claim 1, wherein each of the separators has the first porous layer formed on only one side of the second porous layer.

16. A method for manufacturing an electrochemical device comprising a spiral electrode body that comprises a positive electrode and a negative electrode, each having an active material containing layer, and a pair of separators, each of which includes a first porous layer having a shutdown function and a second porous layer integrated with the first porous layer, and has different friction coefficients on both sides, the method comprising:
lapping the pair of separators one over the other so that higher friction coefficient sides of the respective separators are arranged inside, and wrapping the lapped separators around a winding shaft with a lower friction coefficient side facing the winding shaft;
forming the spiral electrode body by winding the positive electrode and the negative electrode with the pair of separators; and
removing the wound electrode body from the winding shaft,
wherein the first porous layer of each of the separators contains 50 vol % or more of a thermoplastic resin and the second porous layer of each of the separators contains an insulating filler with a heat-resistant temperature of 150° C. or higher and an organic binder for binding insulating filler particles, a content of the insulating filler in the second porous layer being 50 vol % or more.

17. The method according to claim 16, wherein X is more than 5 μm and 30 μM or less, Y is 1 μm or more and 10 μm or less, and X/Y is more than ½ and 10 or less, where X (μm) represents a thickness of the first porous layer and Y (μm) represents a thickness of the second porous layer of each of the separators.

* * * * *